(12) United States Patent
Lawyer et al.

(10) Patent No.: US 8,740,087 B2
(45) Date of Patent: Jun. 3, 2014

(54) TRANSACTION CARD WITH THREE-DIMENSIONAL TIPPING GUIDE

(75) Inventors: Matthew Carl Lawyer, San Francisco, CA (US); Donald Cloyce Wagda, Palo Alto, CA (US)

(73) Assignee: Matthew Lawyer, Park City, UT (US)

( * ) Notice: Subject to any disclaimer, the term of this patent is extended or adjusted under 35 U.S.C. 154(b) by 224 days.

(21) Appl. No.: 12/753,903

(22) Filed: Apr. 5, 2010

(65) Prior Publication Data

US 2011/0073659 A1   Mar. 31, 2011

Related U.S. Application Data

(63) Continuation-in-part of application No. 12/568,664, filed on Sep. 28, 2009.

(51) Int. Cl.
*G06K 5/00* (2006.01)
*G06K 19/00* (2006.01)

(52) U.S. Cl.
USPC .......................................... 235/487; 235/380

(58) Field of Classification Search
USPC ................ 235/380, 492, 487, 379; 705/2, 17; D19/10, 9
See application file for complete search history.

(56) References Cited

U.S. PATENT DOCUMENTS

| | | | | |
|---|---|---|---|---|
| 5,198,646 A | * | 3/1993 | Kunimoto | 235/487 |
| 5,308,121 A | * | 5/1994 | Gunn | 283/99 |
| 5,471,044 A | * | 11/1995 | Hotta et al. | 235/487 |
| 5,506,395 A | * | 4/1996 | Eppley | 235/486 |
| 5,587,560 A | * | 12/1996 | Crooks et al. | 235/380 |
| 6,068,183 A | * | 5/2000 | Freeman et al. | 235/492 |
| D576,671 S | * | 9/2008 | Field et al. | D19/10 |
| 7,441,709 B2 | * | 10/2008 | Chan et al. | 235/492 |
| D602,986 S | * | 10/2009 | Skelding et al. | D19/9 |
| D617,378 S | * | 6/2010 | Skelding et al. | D19/10 |
| D628,236 S | * | 11/2010 | Skelding et al. | D19/10 |
| 2005/0060184 A1 | * | 3/2005 | Wahlbin | 705/2 |
| 2005/0077348 A1 | * | 4/2005 | Hendrick | 235/380 |
| 2006/0169787 A1 | * | 8/2006 | Gelbman | 235/492 |
| 2007/0063054 A1 | * | 3/2007 | Holme | 235/487 |
| 2009/0099961 A1 | * | 4/2009 | Ogilvy | 235/379 |
| 2009/0159688 A1 | * | 6/2009 | Mullen et al. | 235/487 |
| 2010/0217675 A1 | * | 8/2010 | Bookstaff | 705/17 |

* cited by examiner

*Primary Examiner* — Thien T Mai
(74) *Attorney, Agent, or Firm* — Maschoff Brennan, PLLC

(57) ABSTRACT

Disclosed herein is a transaction card with a three-dimensional tipping guide and techniques for using the card. The transaction card includes a base with a front and a back card surface wherein sets of indicators are visible along the outer areas of the front and back card surfaces. The card is configured to be rotated during usage. Also disclosed herein are accessory devices that support the transaction card.

17 Claims, 26 Drawing Sheets

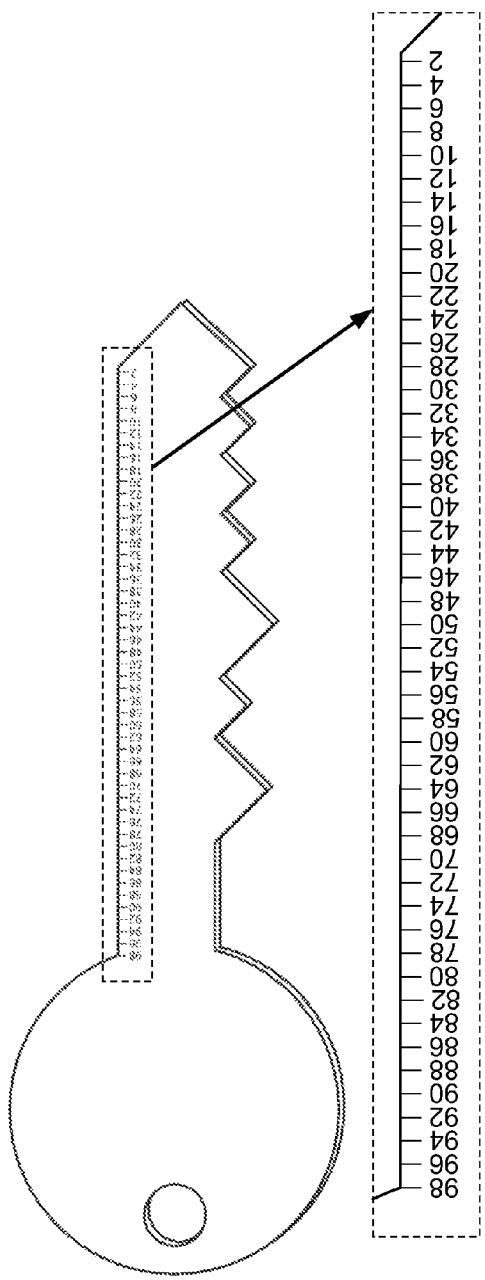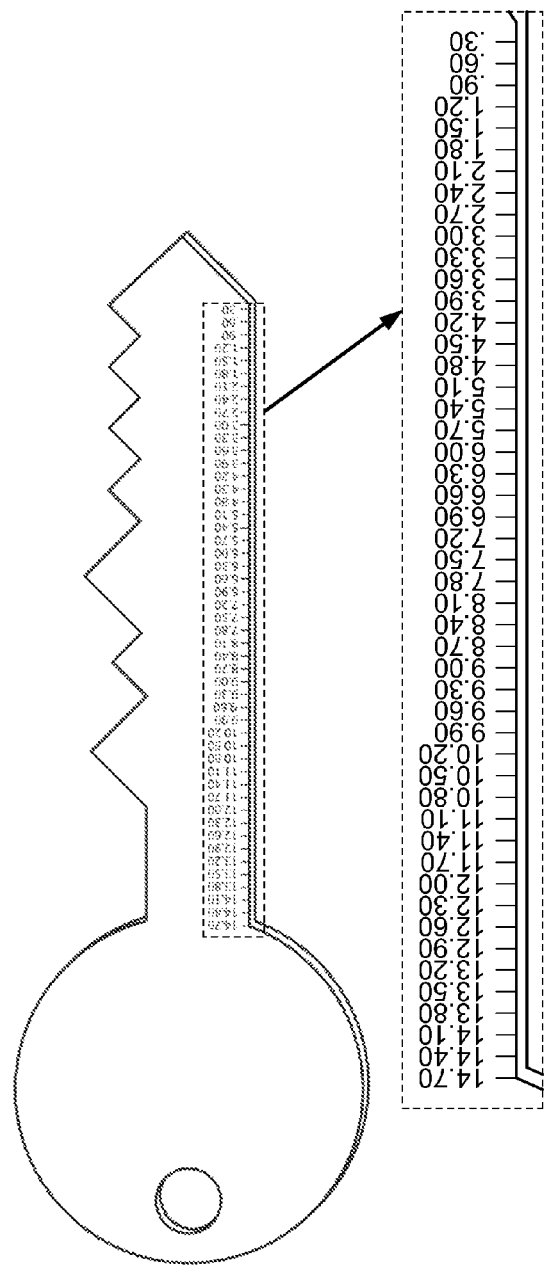
FIG. 8A
FIG. 8B

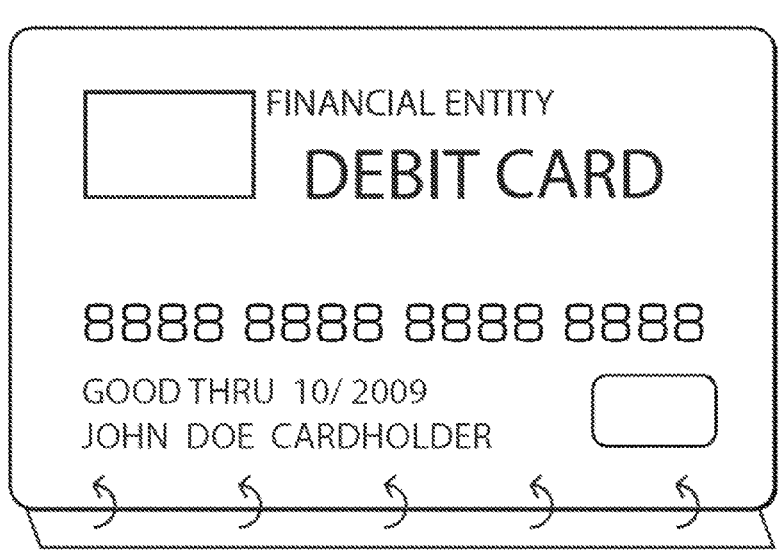
FIG. 11A
FIG. 11C
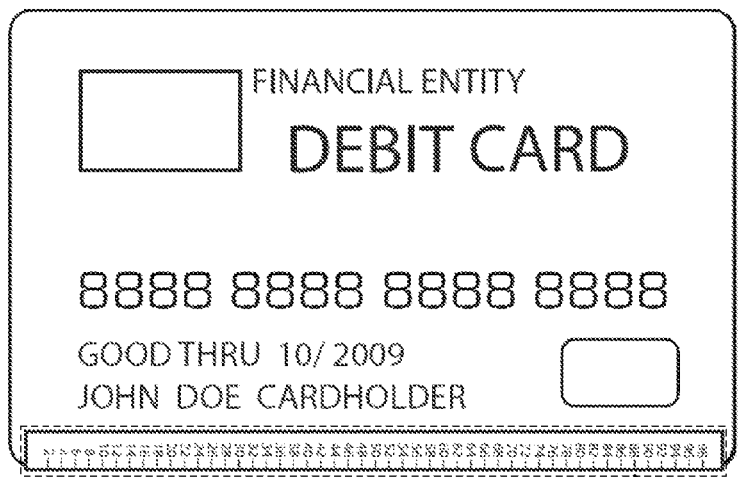
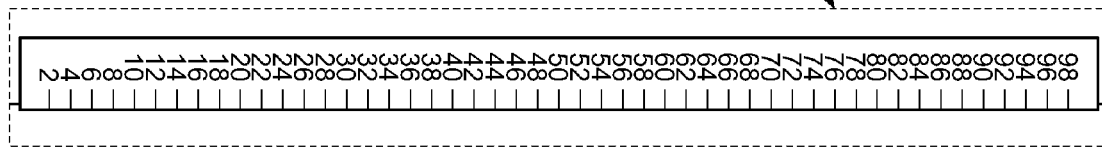
FIG. 11B

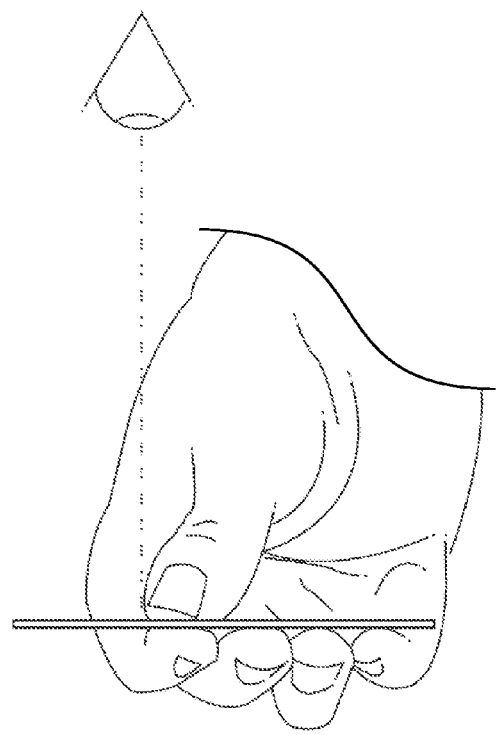
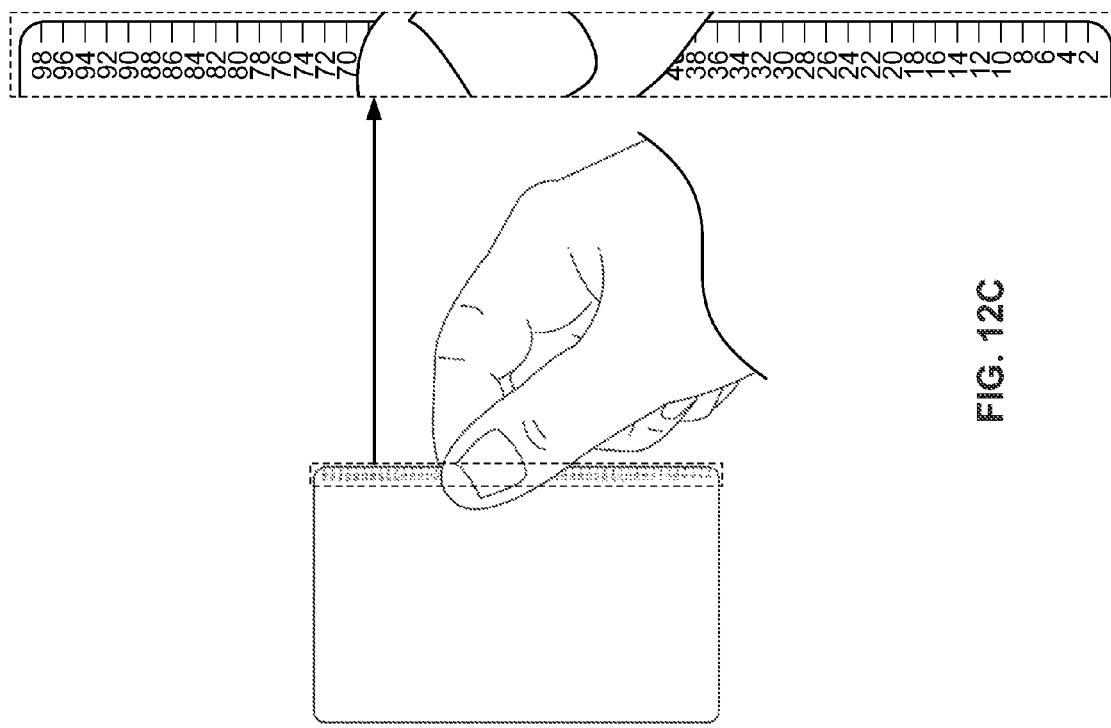

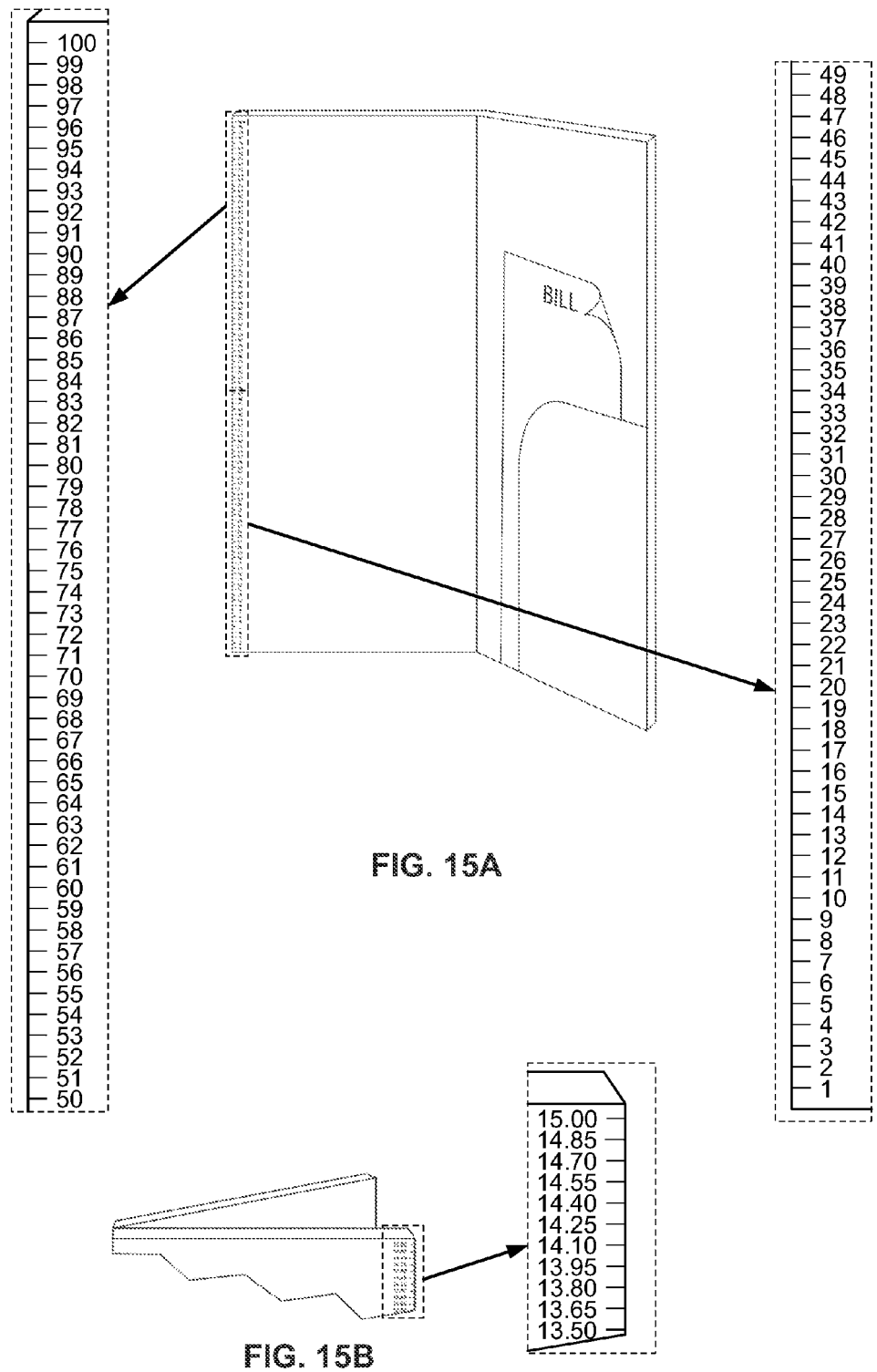

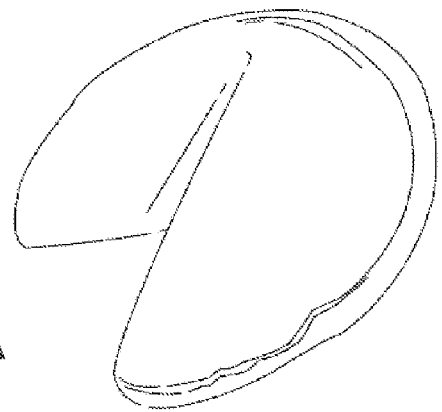
FIG. 19A
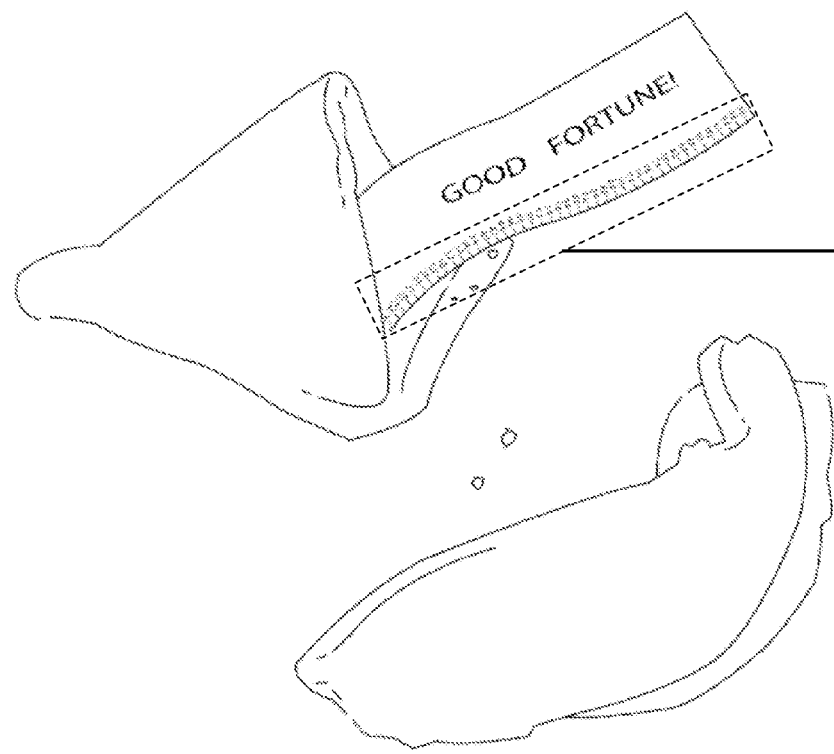 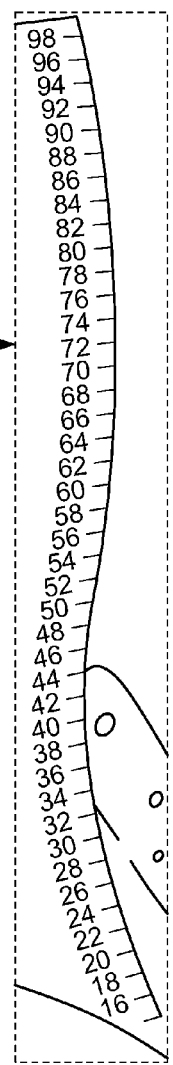
FIG. 19B

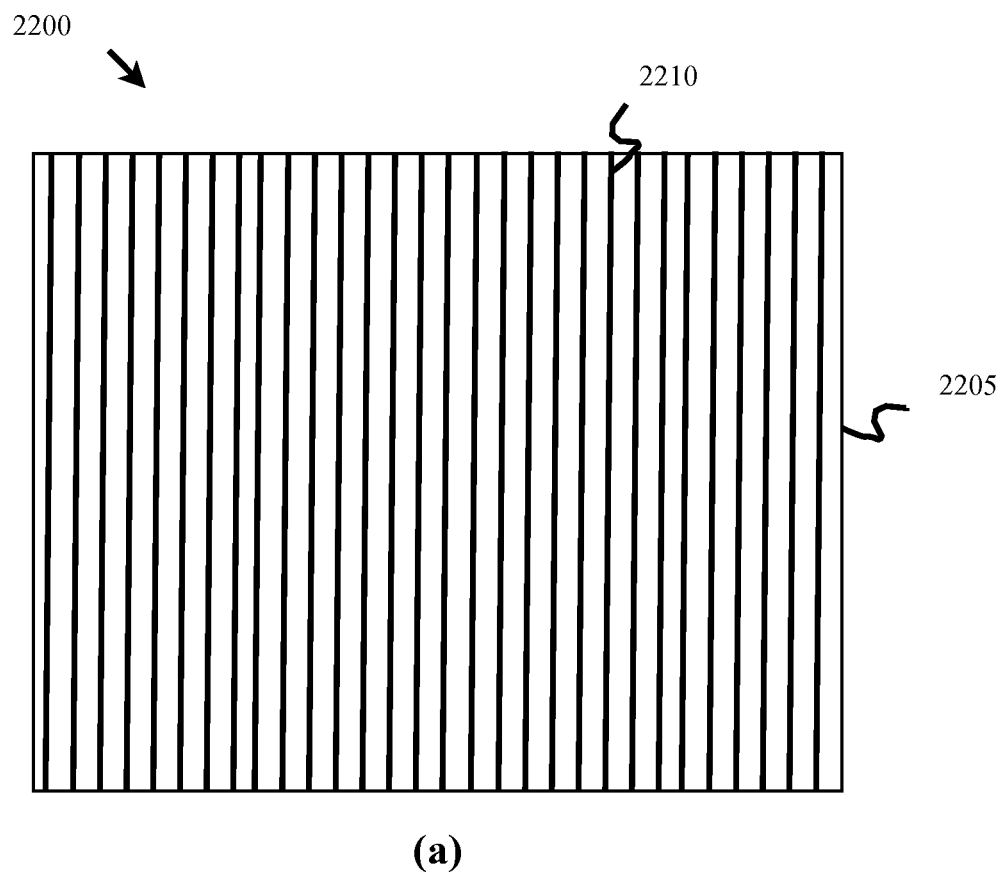
(a)
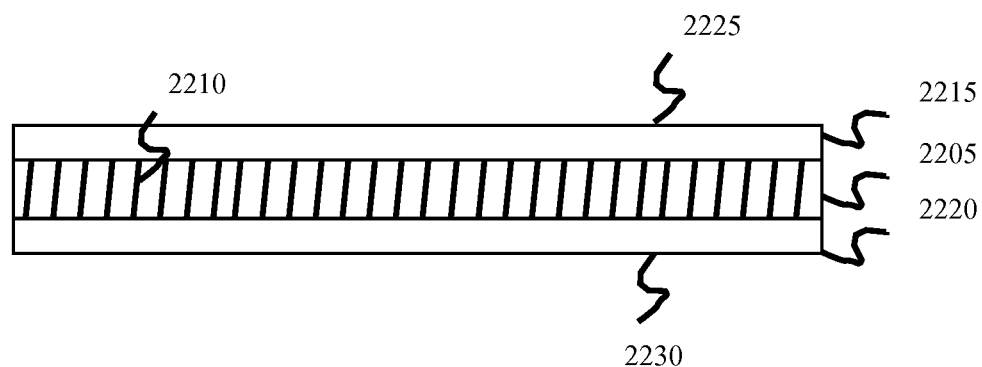
(b)
FIG. 22

TRANSACTION CARD WITH THREE-DIMENSIONAL TIPPING GUIDE

BACKGROUND OF THE INVENTION

Providing a gratuity to a person or persons performing a service, colloquially known as "tipping," is a customary practice. Typically, the recipient of the service, such as a patron or customer, pays a monetary sum as a gratuity to the person or persons performing the service. In some cases, such as with bell desk services, the monetary sum is determined per item (such as one dollar per bag). In other cases, such as with restaurant bills, the monetary sum in a traditional gratuity is typically a fixed percentage of a bill. Unfortunately, calculating a gratuity can be a difficult and unsettling process for many people. The process of determining an appropriate amount can be time consuming and error prone, causing some patrons and customers to under-tip, over-tip, or avoid tipping altogether. For example, a user that "guesses" an appropriate tip may calculate incorrectly or may over-tip or under-tip out of uncertainty.

Unfortunately, products that attempt to assist in the determination of gratuities, such as tipping tables, electronic tipping calculators, and service checks with suggested tipping amounts printed thereon, are also problematic. For example, use of a tipping aid can be socially embarrassing. A user struggling with a mental tip calculation or using an electronic calculator may suffer embarrassment arising from the public display of inadequate mathematical skills. Additionally, tipping aids can be inconvenient (e.g., requiring the user to carry additional items such as a bulky calculator or an additional card in a wallet), may require purchase, and can be complicated to use (e.g., in the case of having to enter information into an electronic tipping calculator).

BRIEF DESCRIPTION OF THE DRAWINGS

Various embodiments of the invention are disclosed in the following detailed description and the accompanying drawings.

FIG. 8A depicts a front view of a key according to one embodiment.

FIG. 8B depicts the back view of the key shown in FIG. 8A.

FIG. 11A depicts a front view of a transaction card which is about to have an affuted tipping guide added to it in form of a sticker.

FIG. 11B depicts the back view of a transaction card which includes an optionally affixed tipping guide in form of a sticker.

FIG. 11C shows the side view of the card depicted in FIG. 11B with a sticker that includes the tipping guide wrapped around the edge of the card.

FIG. 12C is a front view of the card of FIG. 1A depicting the card user's right hand grasping the card after the thumb has been placed underneath the specific amount of money due.

FIG. 12D shows the card user's viewing of the monetary amount due from FIG. 12C.

FIG. 15A shows an inside view of a bill pocket complete with bill.

FIG. 15B shows a partial view of the same bill pocket from FIG. 15A from the outside.

FIGS. 18A through 18C show alternative schematic representations of the indicators of the tipping guide along a vertical line, wherein the vertical line denotes the edge of a transaction card in a 2-dimensional side view.

FIGS. 19A and 19B depict a fortune cookie that includes an example of a transaction card with an incorporated tipping guide.

FIG. 22 shows top cross-section and end views of an exemplary transaction card embodiment fabricated to include at least three layers.

DETAILED DESCRIPTION

The invention can be implemented in numerous ways, including as a device; a process; a method; an apparatus; a system; and a composition of matter. In this specification, these implementations, or any other form that the invention may take, may be referred to as techniques. In general, the order of the steps of disclosed methods may be altered within the scope of the invention. A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The practice of tipping is frequently observed in the food and beverage industry but can occur anytime a service is performed. Accordingly, the techniques described herein can be used in a wide variety of contexts in addition to the food and beverage industry. Additional examples include, but are not limited to limousines, taxis, casinos, cruise ships, contractors, deliveries, salons, clubs, hotels, spas, resorts, tour guides, movers, parking garages, gift wrapping services, pet grooming, shopping, wedding services, events, parties, and many others.

I. The Tipping Guide

Figure 1A:
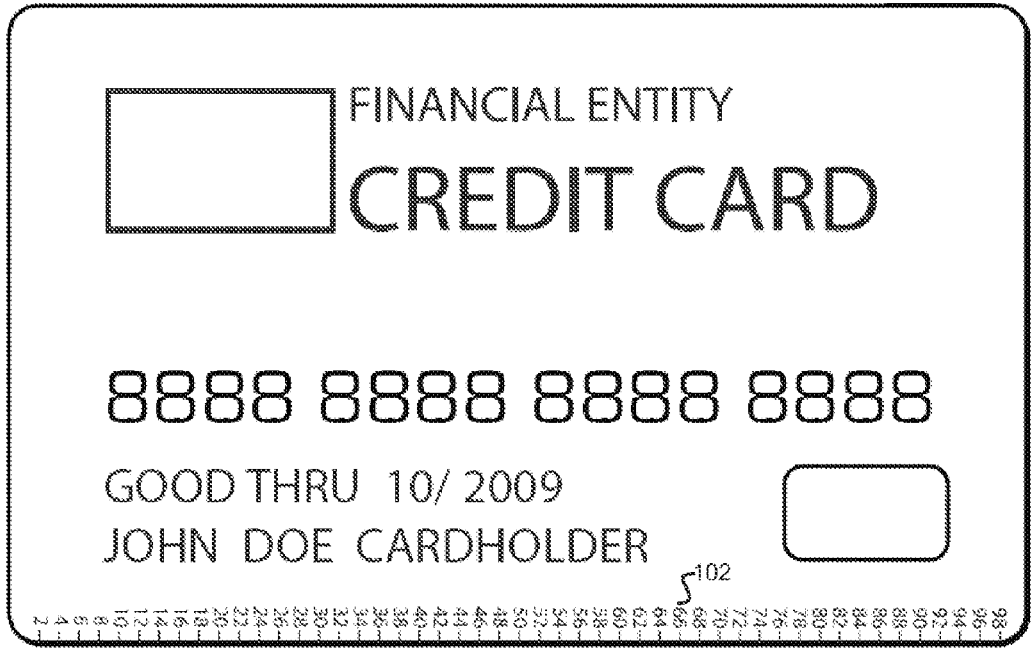
FIG. 1A illustrates a front view of a transaction card according to one embodiment.

FIG. 1A illustrates a front view of a transaction card according to one embodiment. As will be described in more detail below, a transaction card can be configured to provide an integral three-dimensional gratuity calculator (also referred to herein as a "tipping guide"). The front surface of the card shown in FIG. 1A includes a marginal edge having equally spaced indicia designating cost-representative number increments that correspond with monetary units of a bill. In the example shown in FIG. 1A, the cost-representative numbers are displayed in the order of sequential increments of even numbers. Specifically, the cost-representative numbers are shown in decreasing order as sequential increments of 98 to 2. Other cost-representative numbers may also be used, such as sequential increments of odd numbers, integers, or increments of five (e.g., spanning 5-250), as applicable.

Figure 1B:
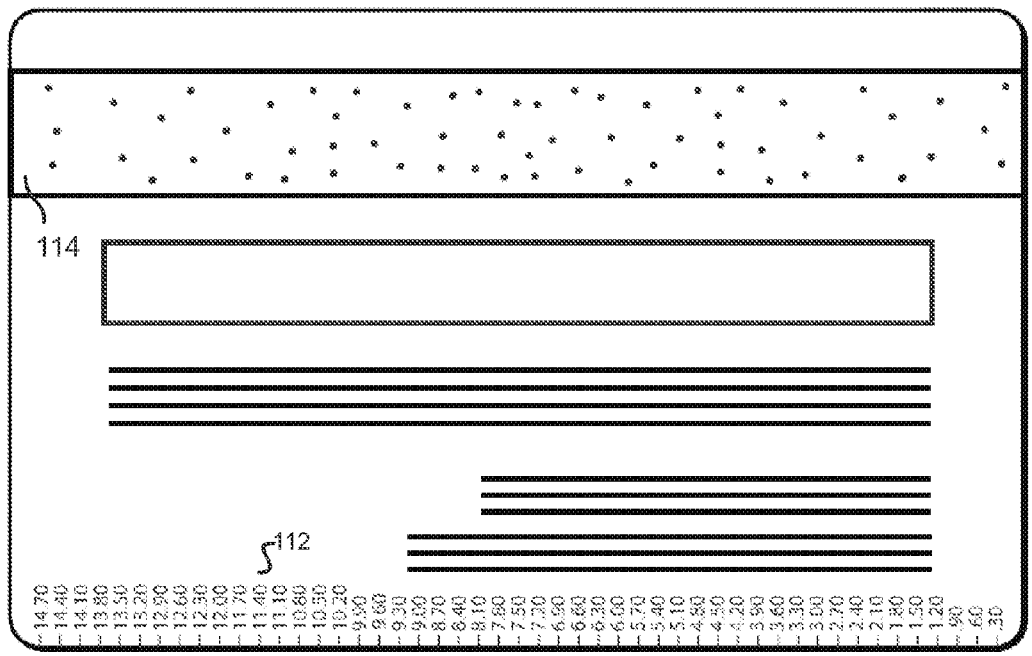
FIG. 1B is a back view of the card of FIG. 1A.

FIG. 1B is a back view of the card of FIG. 1A. The back surface of the card includes a marginal edge where the gratuity numbers are shown in decreasing order as sequential increments from 15% of 98 to 15% of 2.

Figure 1C:
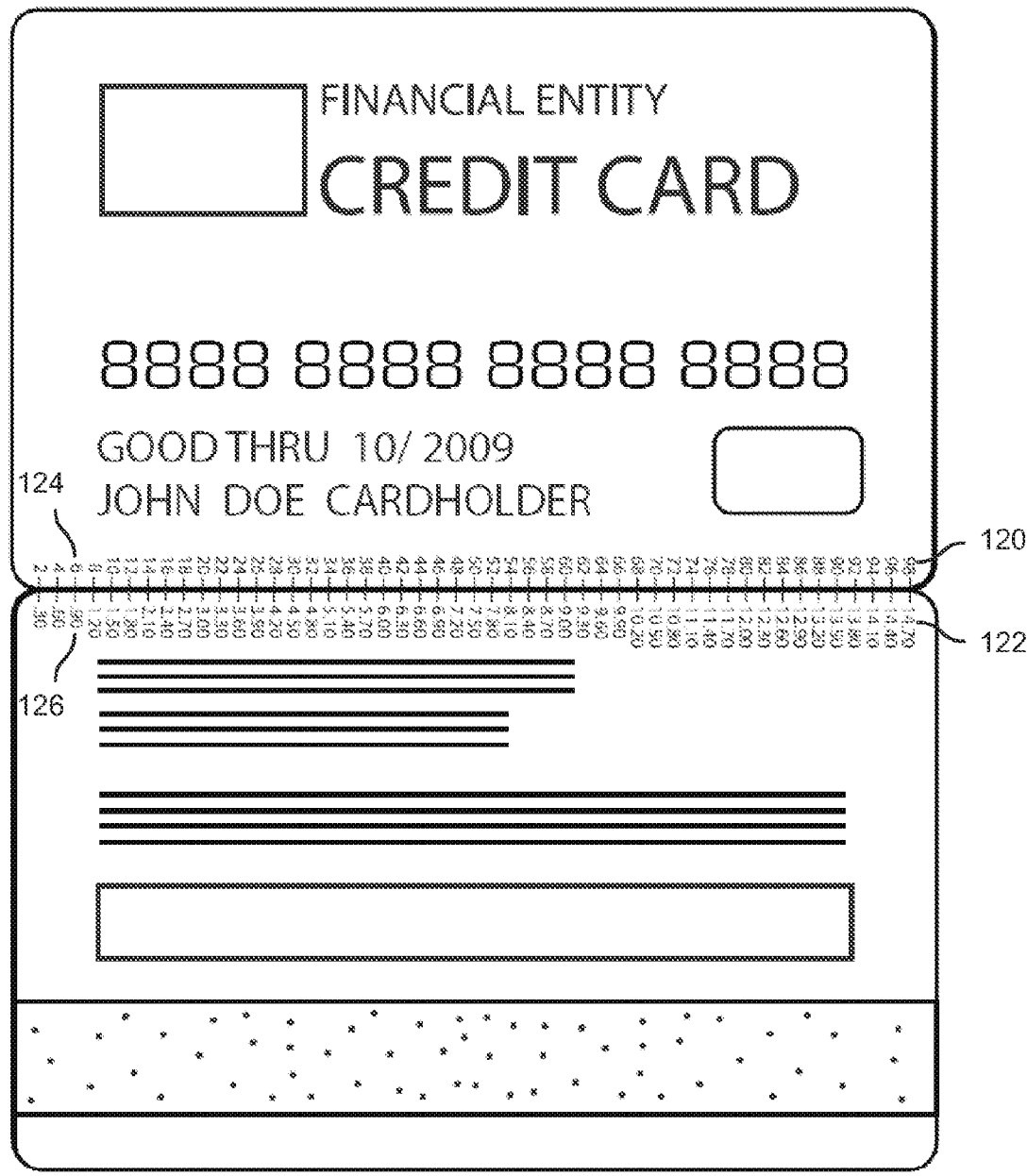
FIG. 1C depicts both the front and back view of the card of FIG. 1A.
Figure 16A:
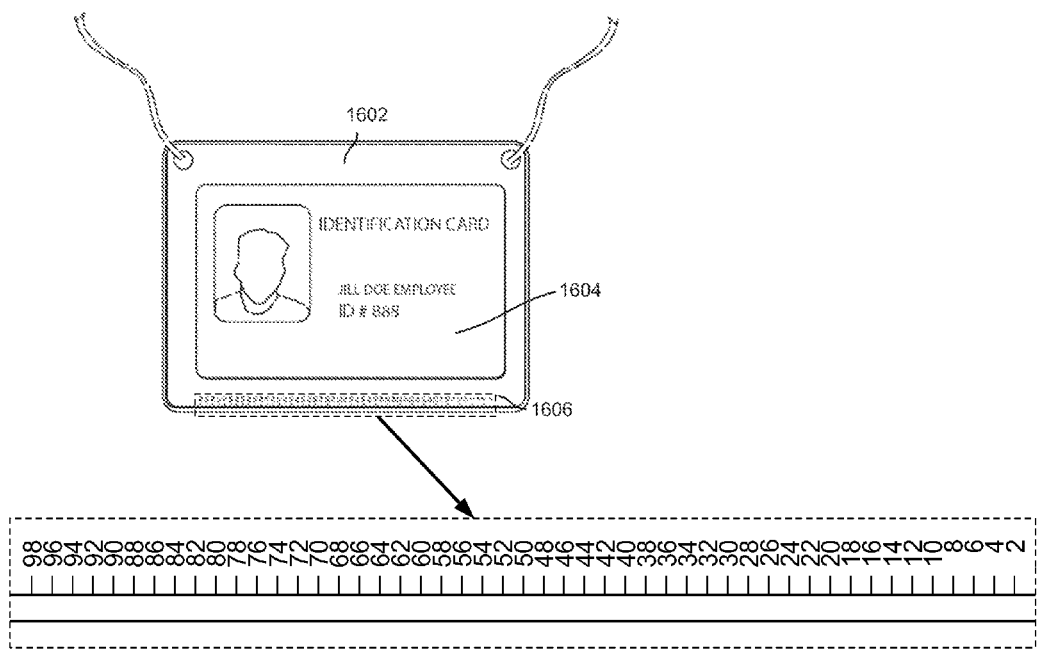
FIG. 16A depicts a front view of an example of a transaction card such as an identification card that is placed inside of a transparent badge holder with a rubberized edge.
Figure 16B:
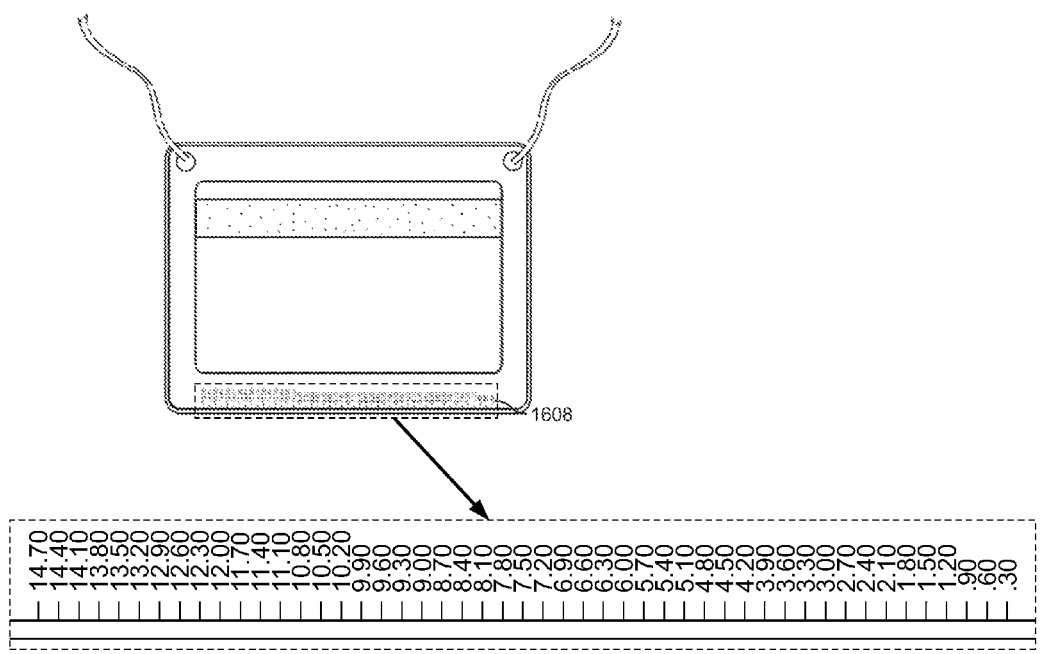
FIG. 16B depicts the back view of the card of FIG. 16A as the card appears from the back while placed in the badge holder.

FIG. 1C depicts both the front and back view of a transaction card. One example of a transaction card is a financial transaction card such as a credit card. Other transaction cards can also be used in conjunction with the techniques described herein, such as smart cards (FIG. 7A), charge cards, check cards, debit cards (FIG. 2A), deferred debit cards, automated teller machine cards, cash access cards, gift cards, prepaid cards, electronic purse cards, key-chain cards (FIG. 6A), access cards (FIG. 9A), meal voucher cards (FIG. 10A), hotel key cards (FIG. 4A), information storage cards, electronic commerce cards, and identification cards (FIG. 16A).

The transaction card includes a base with a front card surface (FIG. 1A), a back card surface (FIG. 1B), and first (120) and second (122) oppositely facing outer areas. The transaction card also includes a region configured to carry machine readable information such as a magnetic stripe (114), a compound, a barcode, key teeth and notches, smart chip, a plurality of punched holes, an RFID tag, and the like. As described in conjunction with FIGS. 8A and 8B, in some embodiments the techniques described herein are applied to other objects which facilitate transactions, such as a physical key which facilitates the opening of a lock.

The transaction card also includes a first and a second set of indicators (102 and 112) that are visible along the respective first and second oppositely facing outer areas. In some embodiments at least one of the first and second sets of indicators represents a financial amount. For example, the first set of indicators represents Dollars, Euros, or any other appropriate currency, while the second set of indicators represents a payment amount that is a result of a function of a percentage (e.g., 15%, 20%, etc.) of the first set of indicators such as a tip or gratuity.

As one example, the transaction card illustrated in FIGS. 1A-1C is configured to provide a user with tipping information at the 15% rate. Suppose a first indicator represents $6 (124). The corresponding second indicator represents a 15% gratuity amount of $0.90 (126).

In the example shown in FIGS. 1A-1C, the indicators are printed along the edges (i.e., the outer areas) of the respective front and back of the card surface. FIG. 1A shows the indicators (the cost-representative numbers) on the front of the credit card along the edge of the card. FIG. 1B shows the indicators (the gratuity numbers) on the back of the credit card along the edge of the card.

A typical financial transaction card such as the credit card shown in FIGS. 1A-1C commonly includes the machine readable information, embossed lettering (e.g., name of credit card holder, number of credit card, expiration date, etc.), financial entity identifying information (e.g., logo types and the like), and security features (e.g., hologram panel, etc.). These and similar features generally take up most of the available space on the front and back of the card while leaving a small margin at the edges or outer areas of the card. As shown in FIGS. 1A-1C, tipping information can nonetheless successfully be integrated into the transaction card (e.g., along the margin adjacent to the bottom edge of the transaction card).

In various embodiments, the transaction card includes additional or alternative indicia to assist the user of the tipping guide. Examples of indicia include "c($)", "(15%)", 3/0, 17.5%", "20%, "25%, "30%, "credits", "pesos", "dollars", "cpoints", c'yuanyy, "euros", "O" "35%", "40%", "45%", "50%, "bill", "tip", "due", "flip overyy, and "gratuity", and may appear directly on the tipping guide next to the appropriate numbers. Also, in various embodiments, the tipping guide includes a plurality of spaced apart indicia on the front side of the card as well as a plurality of spaced apart indicia on the back side of the card that are comprised of tactile sensing portions that include a plurality of equally spaced apart nubs for visually impaired users. The nubs provide the ability to tactilely sense indicia without having to rely on sight. Indentations at the edges or outer areas of the card can also be used to provide the ability to tactilely sense indicia without having to rely on sight to locate the appropriate cost-representative number with the user's thumb.

Figure 2A:
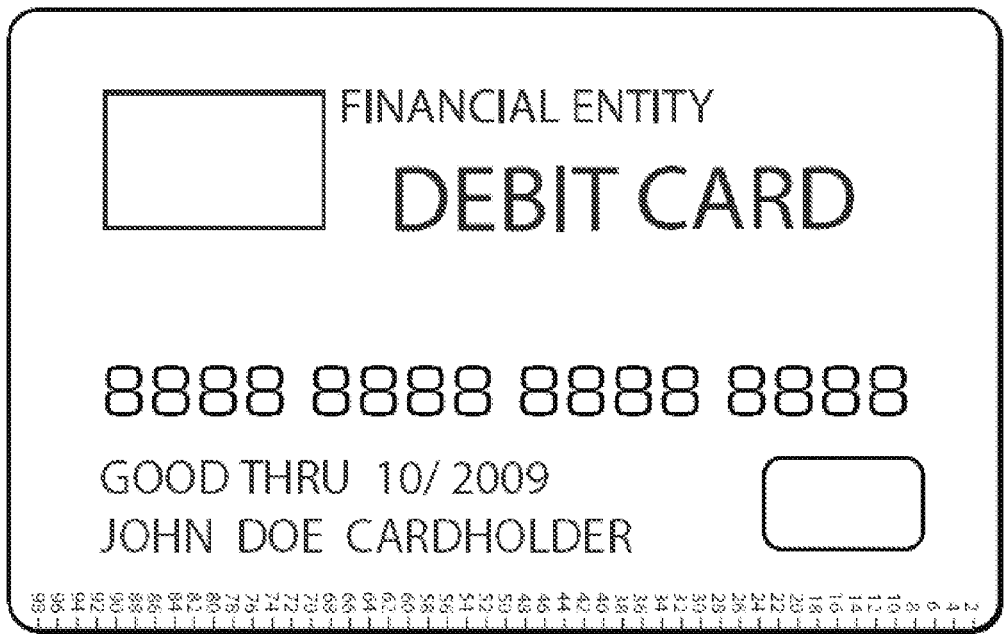
FIG. 2A illustrates a front view of a transaction card according to one embodiment.
Figure 2B:
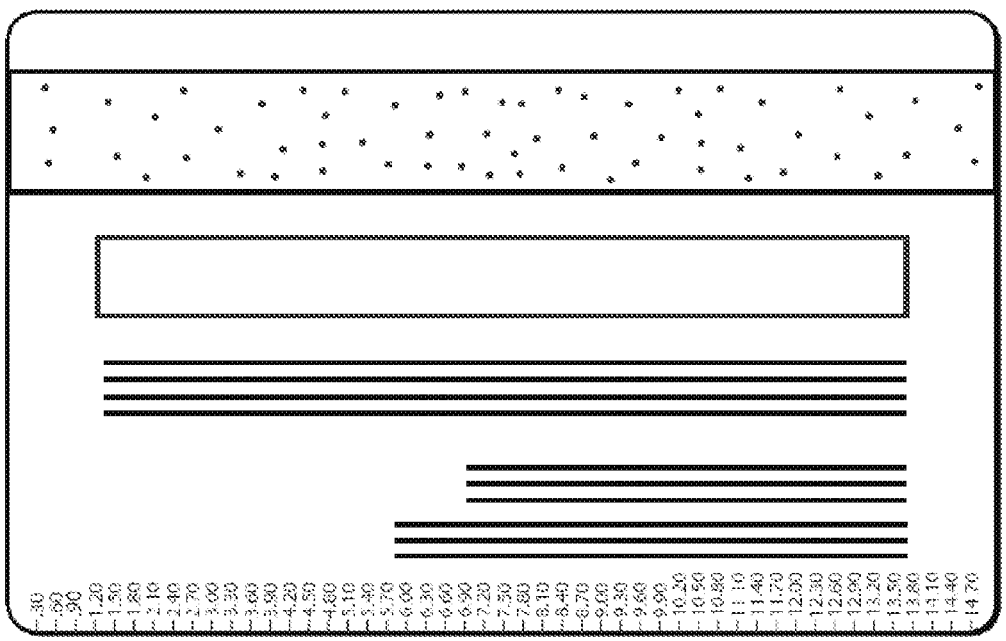
FIG. 2B is a back view of the card of FIG. 2A.

FIG. 2A illustrates a front view of a transaction card according to one embodiment. FIG. 2B is a back view of the card of FIG. 2A. As with FIG. 1A, FIG. 2A illustrates a front surface of the transaction card having cost-representative numbers adjacent to the edge of the transaction card. In the example shown in FIG. 2A, the cost-representative numbers are shown in the order of sequential increments of even numbers. Specifically, the cost-representative numbers are shown in increasing order as sequential increments of 2 to 98. As with FIG. 1B, FIG. 2B illustrates a back face of the transaction card showing the gratuity numbers on top of the edge of the transaction card. In the example shown in FIG. 2B, the gratuity numbers are shown in the order of sequential increments of numbers that represent a percentage of the corresponding cost-representative numbers. Specifically, the gratuity numbers are shown in increasing order as sequential increments from 15% of 2 to 15% of 98.

Figure 3A:
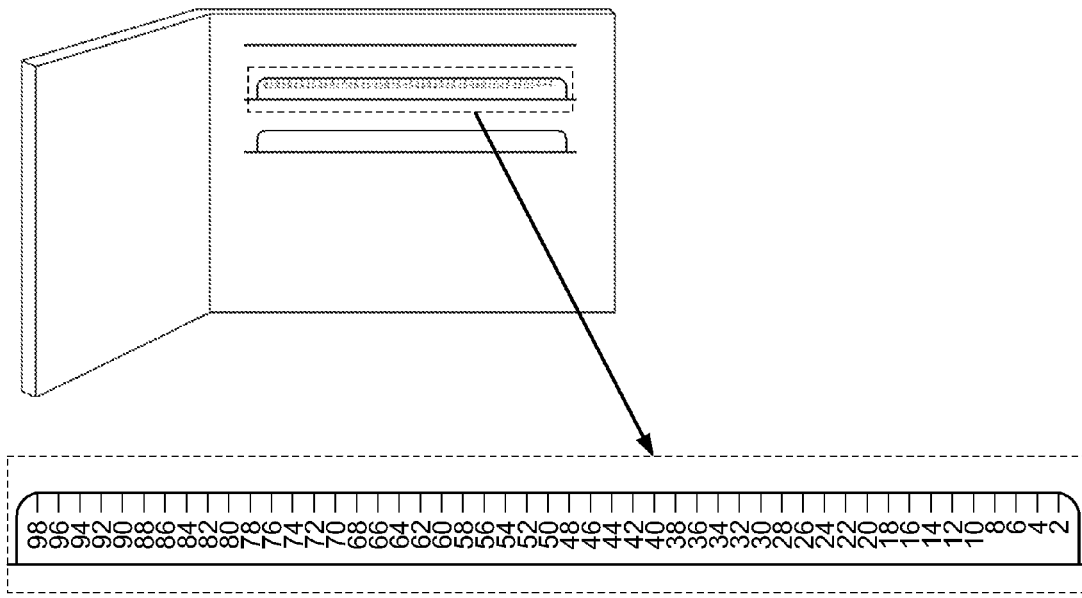
FIG. 3A depicts a transaction card according to one embodiment inside a horizontal wallet.
Figure 3B:
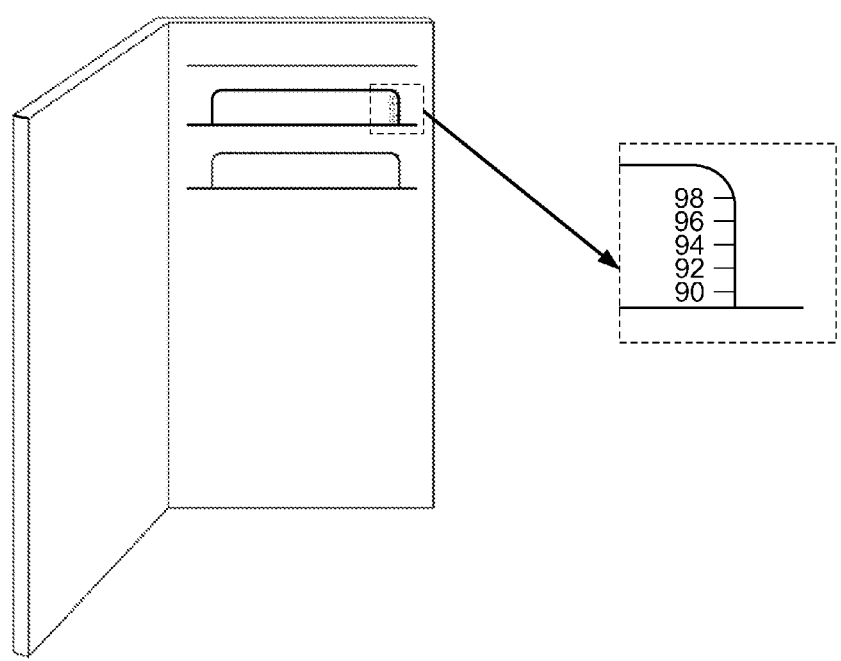
FIG. 3B depicts a transaction card according to one embodiment inside a vertical wallet.

When the user employs a typical wallet with partitions, in some embodiments the tipping guide aspect of the transaction card is visible upon opening the wallet, thus drawing the user to select the transaction card with the three-dimensional tipping guide over other available cards or forms of payment. This is as illustrated in FIGS. 3A and 3B which depict the transaction card with the visible tipping guide as it appears contrasted with another transaction card in a wallet.

The transaction card can take a variety of forms and be made of a variety of materials so long as there are two surfaces and an edge (i.e., an outer area on each surface). Any desirable material can be employed to design such cards resulting in solid-, opaque-, transparent, translucent cards, and the like.

Figure 4A:
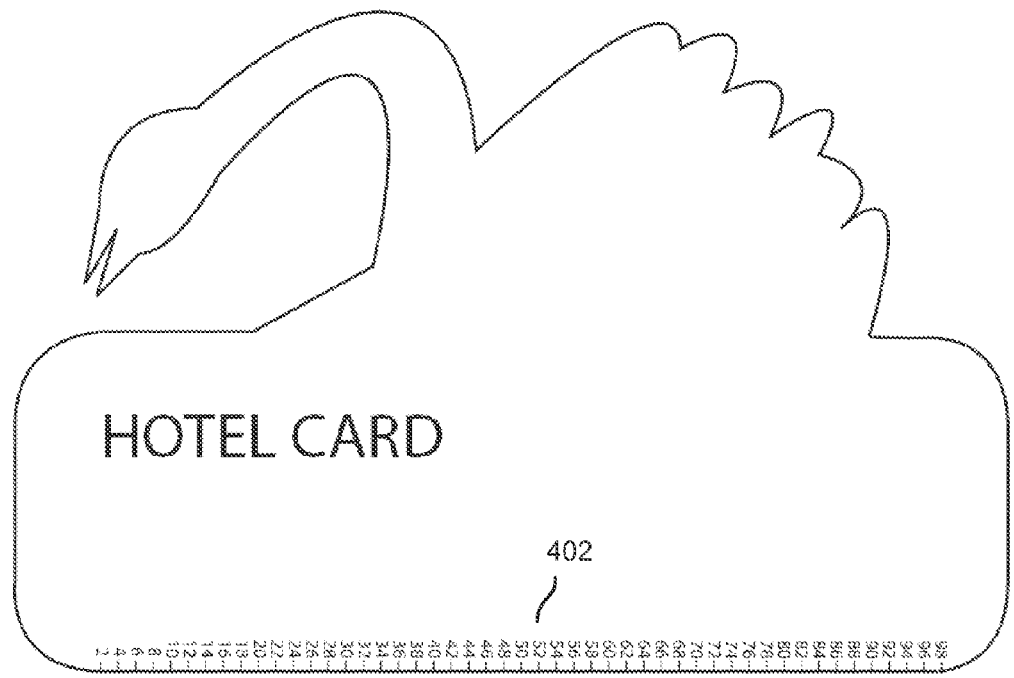
FIG. 4A depicts a front view of a transaction card in which the transaction card resembles a swan.
Figure 4B:
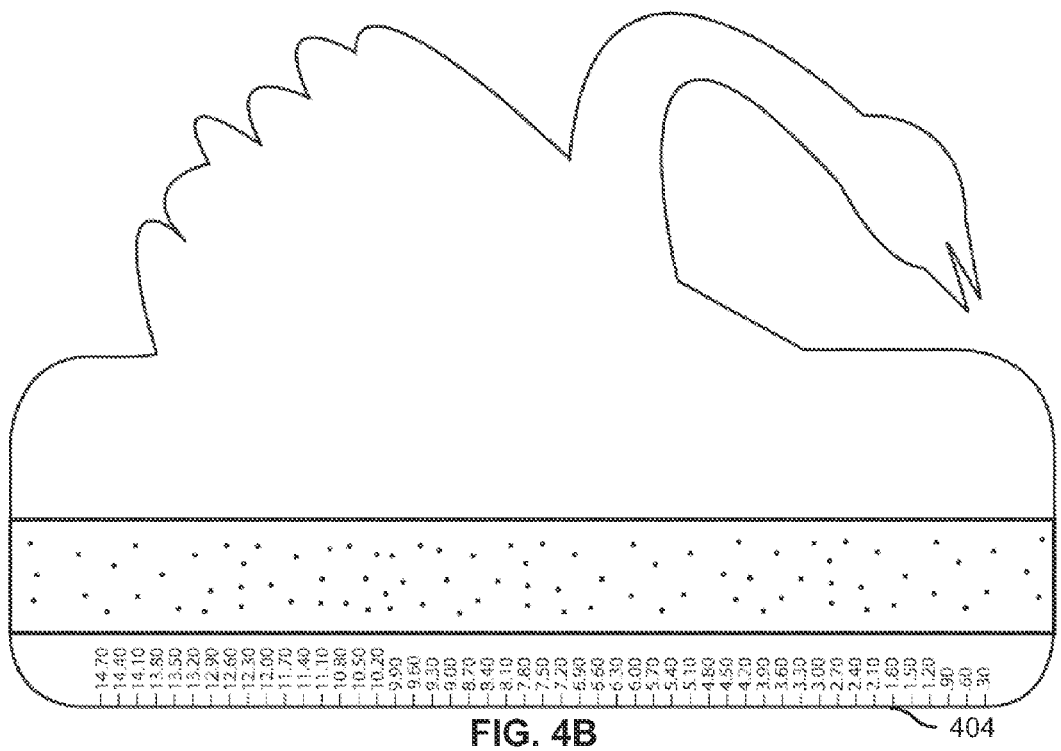
FIG. 4B depicts the back view of the card shown in FIG. 4A.

For example, FIG. 4A depicts an embodiment of a transaction card in the form of a specific figure that can function as a hotel card. Specifically, FIG. 4A depicts a front view of a transaction card in which the transaction card resembles a swan. FIG. 4B depicts the back view of the transaction card which resembles a swan. Cost-representative numbers are displayed in region 402. Gratuity representative numbers are displayed in region 404.

Figure 5A:
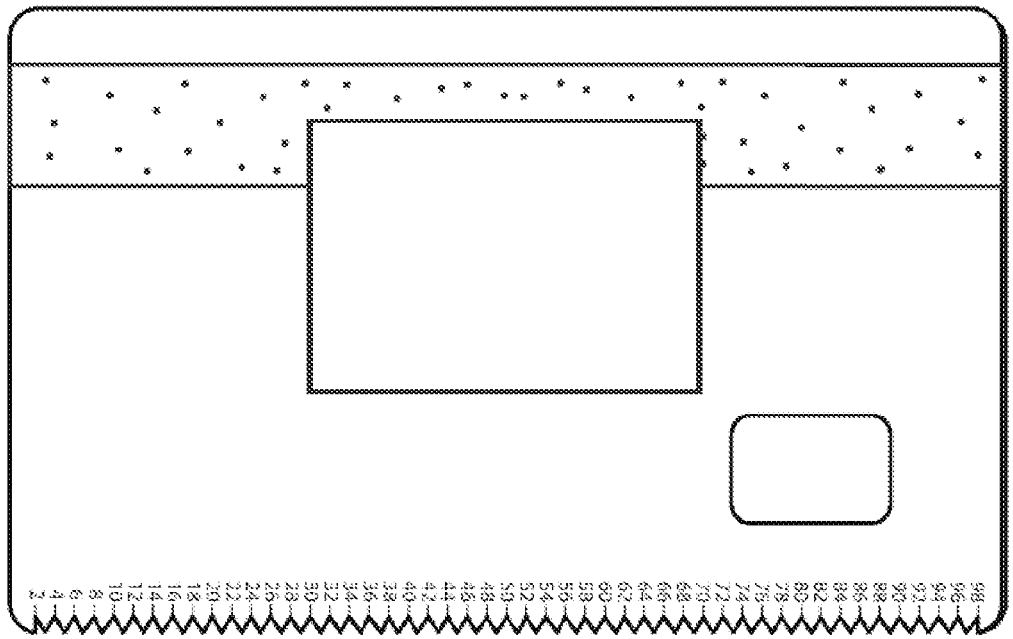
FIG. 5A depicts a front view of an embodiment of a transaction card that is a semi-opaque card with an opaque design in the center and optional notches on the edge.
Figure 5B:
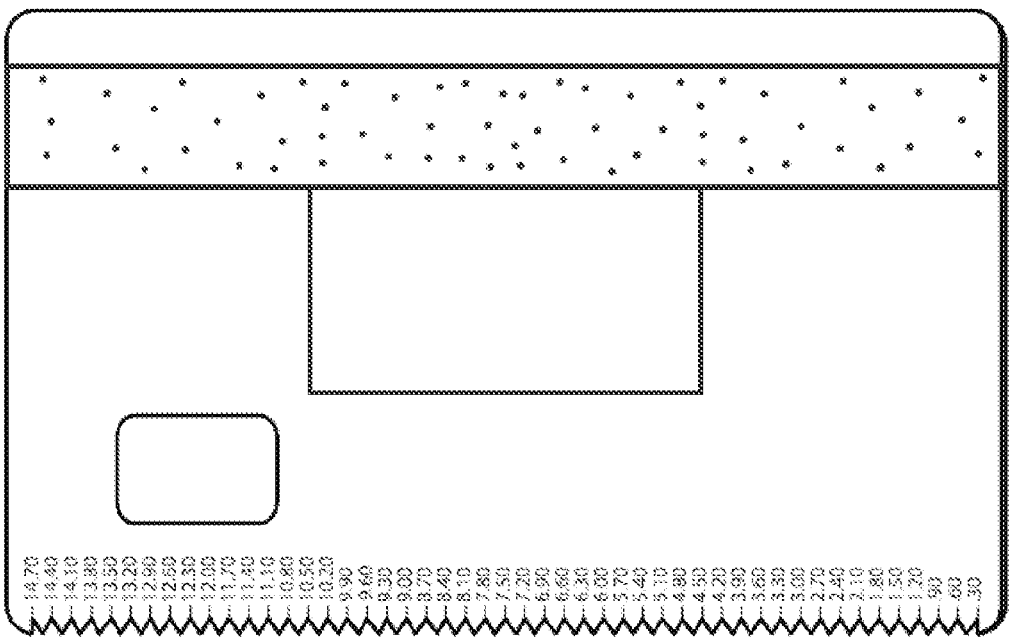
FIG. 5B depicts the back view of the card shown in FIG. 5A.

In another example, FIG. 5A depicts a front view of an embodiment of a transaction card that is a semi-opaque card with an opaque design in the center and optional notches on the edge. FIG. 5B depicts the back view of FIG. 5A.

Figure 6A:
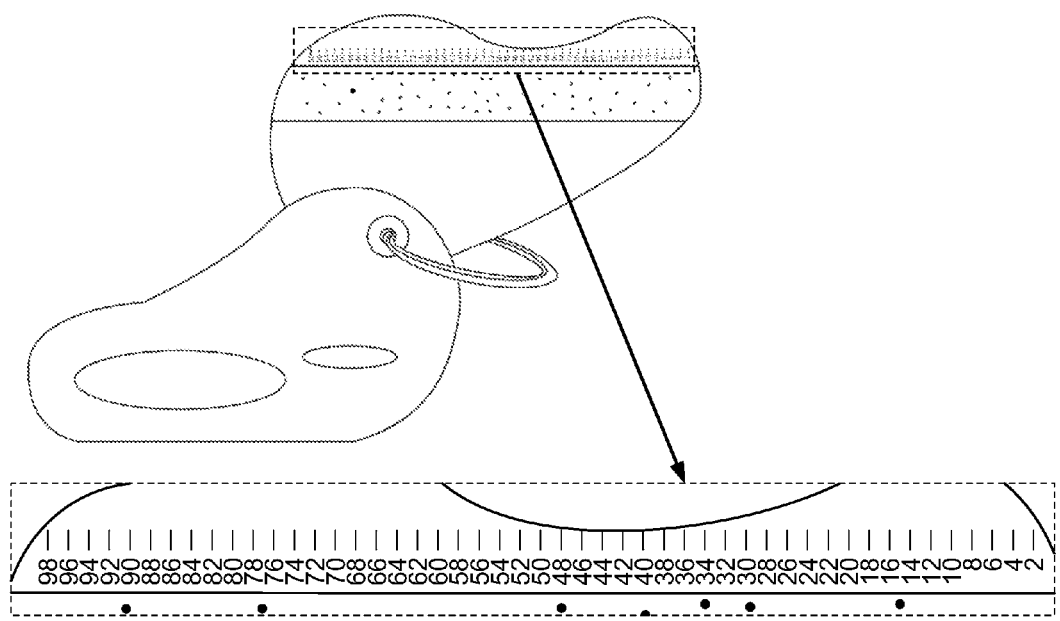
FIG. 6A depicts a front view of a grocery store keychain loyalty card according to one embodiment.
Figure 6B:
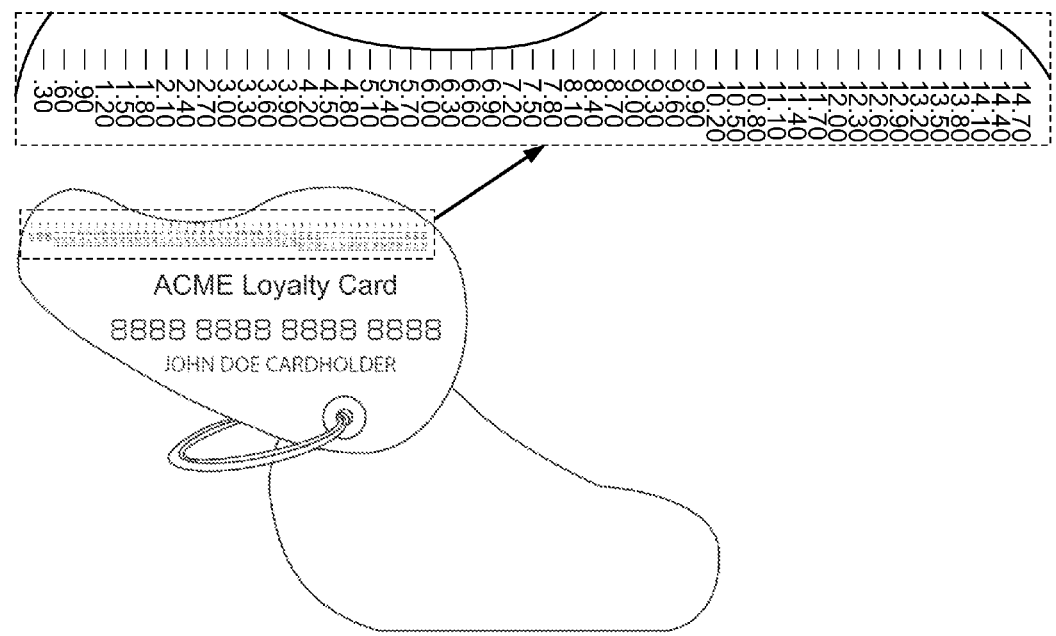
FIG. 6B depicts the back view of the card shown in FIG. 6A.

In another example, FIG. 6A depicts a front view of a grocery store keychain loyalty card according to one embodiment. In the example shown, the loyalty card includes a magnetic stripe and can be used to make payments. In other embodiments, the loyalty card includes a barcode instead of a magnetic stripe. FIG. 6B depicts the back view of FIG. 6A.

Figure 7A:
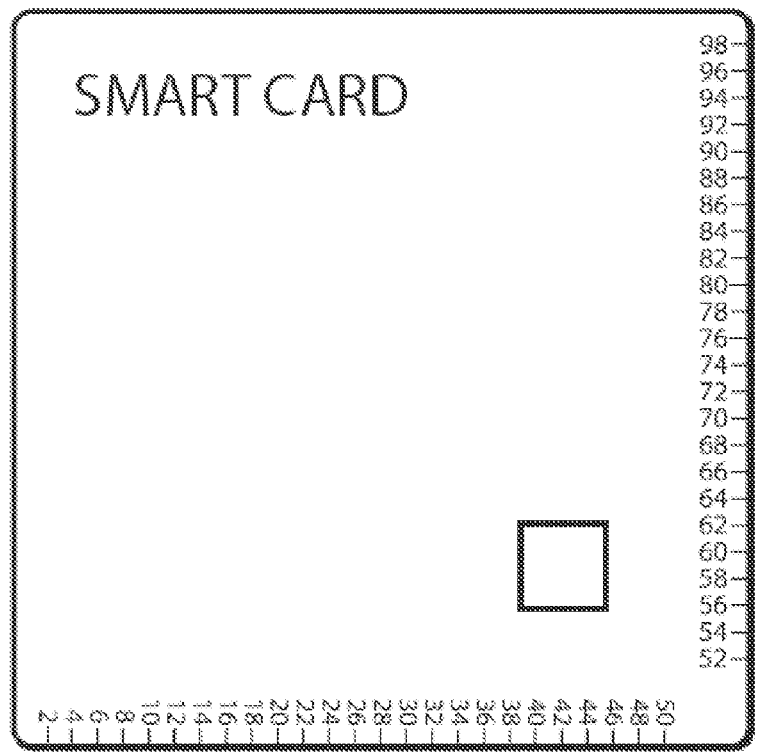
FIG. 7A depicts a front view of a smart card according to one embodiment.
Figure 7B:
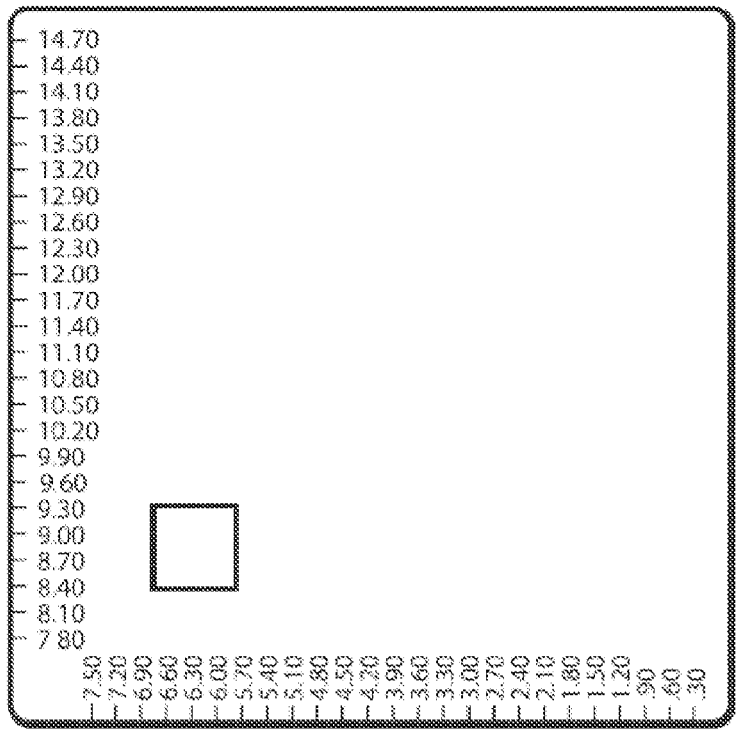
FIG. 7B depicts the back view of the card shown in FIG. 7A.

In another example, FIG. 7A depicts a smart card according to one embodiment. In the example shown, cost-representative numbers span two edges of the card. FIG. 7B depicts the back view of FIG. 7A. The gratuity indicators similarly span two edges of the card shown in FIG. 7B.

In another example, FIG. 8A depicts a front view of a key according to one embodiment. FIG. 8B depicts the back view of FIG. 8A. The key shown in FIGS. 8A and 8B is a rental car key. Many different types of objects can incorporate the techniques described herein, as well. For example, an identification-, membership- or access card can be combined with the indicators that comprise a tipping guide. Such cards are routinely employed for verifying age, gender, membership status, and the like, and thus, are often used in exchange for various items. An example is a club (e.g., fitness club, golf club, spa, etc.), which routinely provides services for which gratuities are common (e.g., trainers, equipment, lockers, cleaning personnel). As such, the tipping guide can be conveniently used to quickly calculate an appropriate gratuity before handing over a tip in cash. Other examples of items that can incorporate the techniques herein include badge holders (FIG. 16A), sleeves (FIG. 17A), fortune cookie inserts (FIG. 19B), table tents, take-out-containers, silverware, tablecloths, placemats, menus, napkins, coasters, traveler's checks, bank notes, documents and other papers, and currency.

Figure 9A:
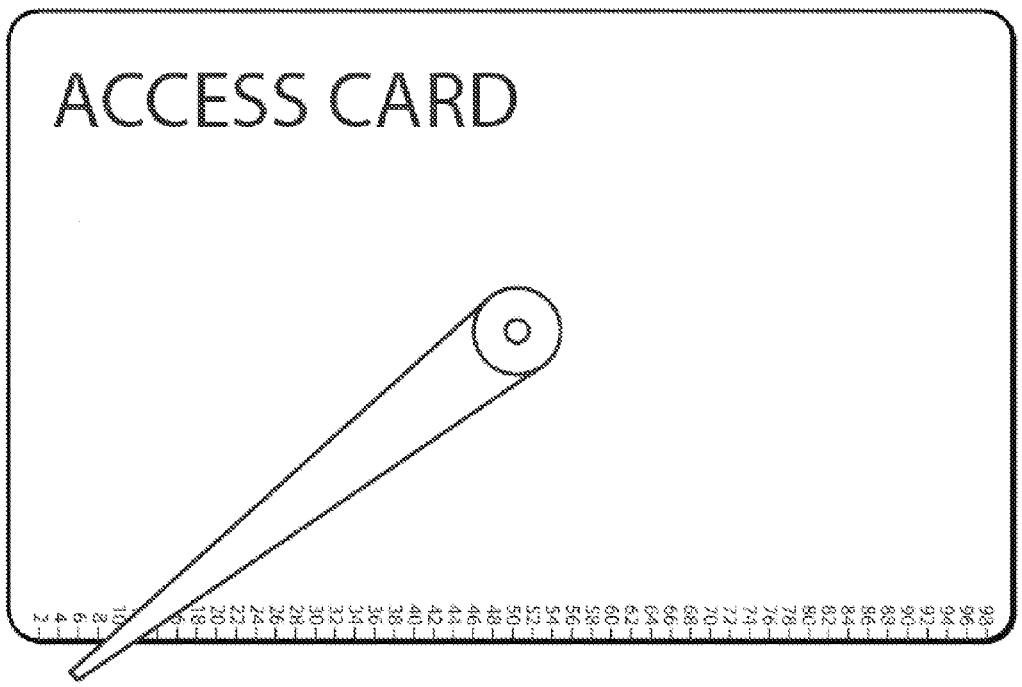
FIG. 9A depicts a front view of a transaction card incorporated tipping guide.
Figure 9B:
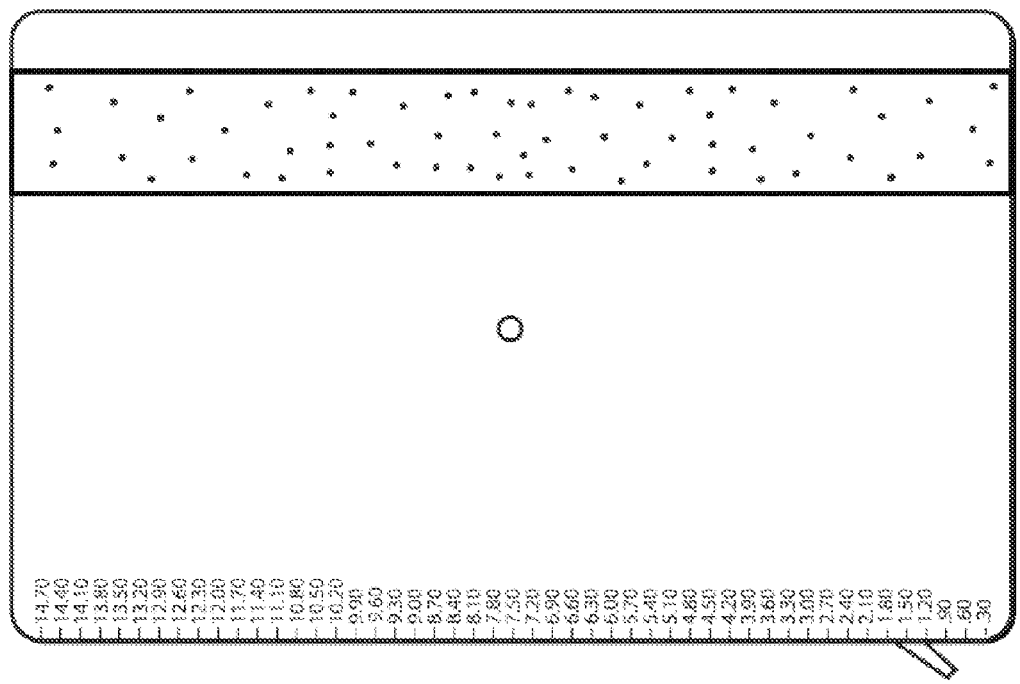
FIG. 9B depicts the back view of the card shown in FIG. 9A.

In various embodiments, an external movable and/or slidable cursor can be employed in combination with the transaction card and three dimensional tipping guide. For example, FIG. 9A depicts a front view of a transaction card incorporated tipping guide. In the example shown, a movable pointer is included for selecting the appropriate pair of indicators. FIG. 9B depicts the back view of FIG. 9A.

Figure 10A:
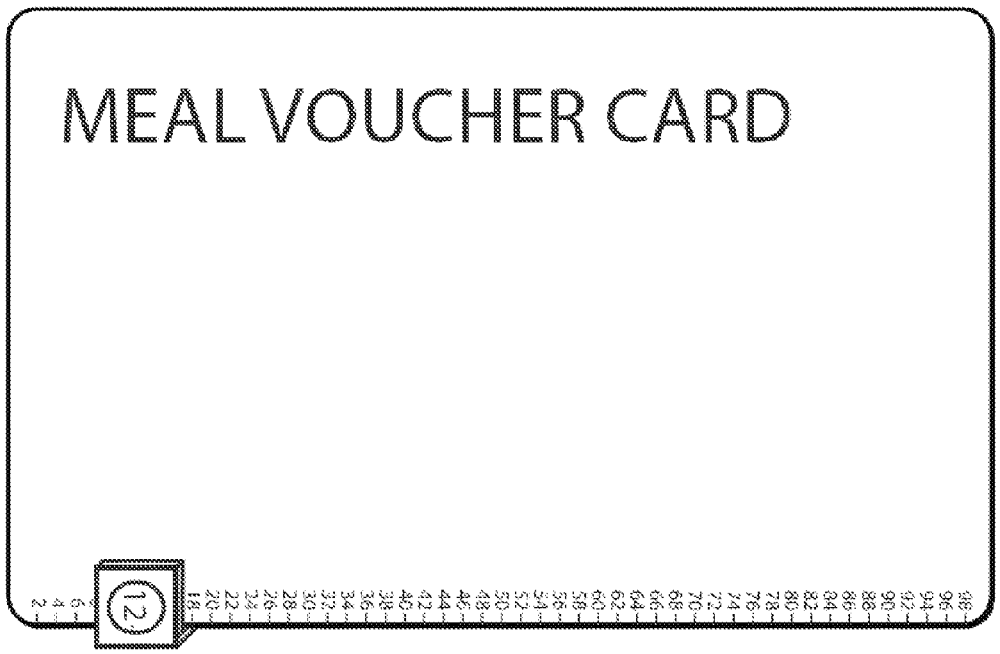
FIG. 10A depicts a front view of a transaction card incorporated tipping guide.
Figure 10B:
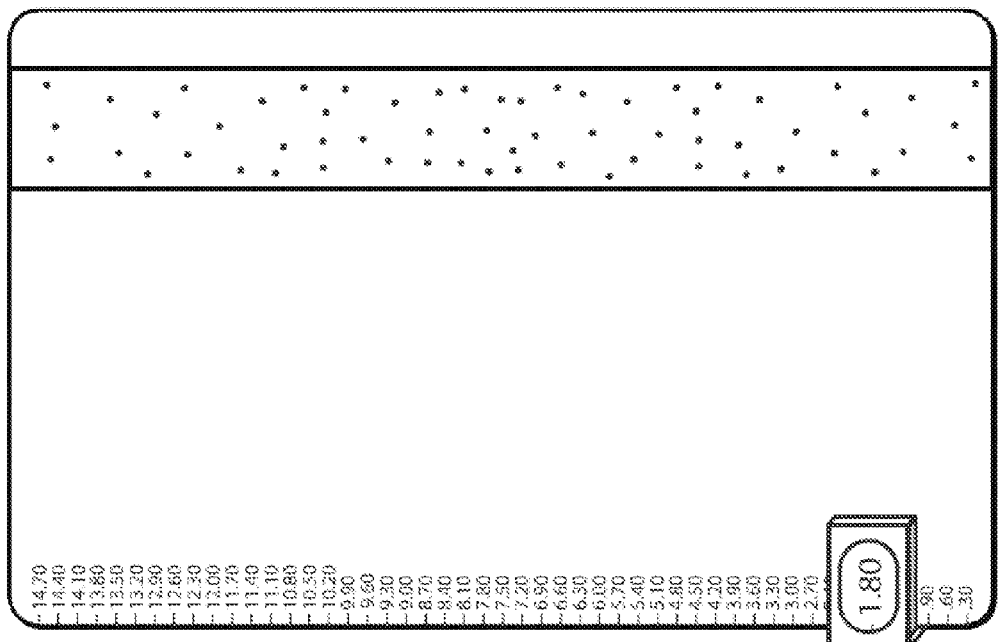
FIG. 10B depicts the back view of the card shown in FIG. 10A.

In another example, FIG. 10A depicts a front view of a transaction card incorporated tipping guide. In the example shown, the transaction card is a meal voucher card with an optionally attached magnifying marker for selection of the indicators. FIG. 10B depicts the back view of FIG. 10A.

In some embodiments, the first and second sets of indicators (e.g., 102 and 112) are applied by the manufacturer of the transaction card. For example, in the case of a credit card, the indicators are applied at the time the card is printed. In other embodiments, the indicators are applied after manufacturer. One example is for the indicators to be applied as one or more stickers. FIG. 11A depicts a front view of a transaction card which is about to have an affixed tipping guide added to it in form of a sticker. In the example shown, the transaction card is a debit card. FIG. 11B depicts the back view of a transaction card which includes an optionally affured tipping guide in form of a sticker. FIG. 11C shows the side view of the card depicted in FIG. 11B with a sticker that includes the tipping guide wrapped around the edge of the card.

II. Using the Tipping Guide

A method, according to one embodiment, of calculating a gratuity by using a transaction card with a three-dimensional tipping guide as describe herein will now be described. A person's thumb and index finger are placed on the transaction card. This includes grasping the card with a thumb and an index finger (see FIG. 12C); viewing printed indicators on the surface of the card above where the thumb is placed (see FIG. 12D); then turning the card over (i.e., rotating the card) while grasping the card with the thumb and index finger (see FIG. 12E); and viewing additional printed indicators on the back of the card above where the index finger is placed (see FIGS. 12F and 12G). This hand movement can be performed swiftly and conveniently while holding, for example, a credit card that encompasses the tipping guide. The printed indicators above the thumb include cost-representative numbers of the range from 1 to 100 (or any other appropriate range) on the front side of the card while the printed indicators on the back side of the card above the index finger include gratuity-representative numbers representing a percentage of the cost-representative numbers. In various embodiments, the cost-representative numbers are placed on the back side of the card while the gratuity numbers are placed on the front side of the card.

With only slight movements of the hand, such as sliding his thumb along the cost-representative numbers on the card in order to locate the correct number that represents the closest number to the cost (see FIG. 12B) and then a flip of the card (see FIG. 12E), the user can quickly view an appropriate gratuity amount which may be rendered for any given service or item.

In various embodiments, cards such as the card shown in FIGS. 1A-1C are provided, along with instructions for use (e.g., describing the manipulations or actions depicted in FIGS. 12A-12G) of such cards, are provided by a card issuer (e.g., a merchant, financial institution, credit card company, or gift card company) to consumers. One result of the card's making it easier for consumers to calculate gratuities is that consumers will be more likely to use the card as part of financial transactions, potentially resulting in more revenue for the card issuer and other participants in the process of executing the transaction.

Figure 12B:
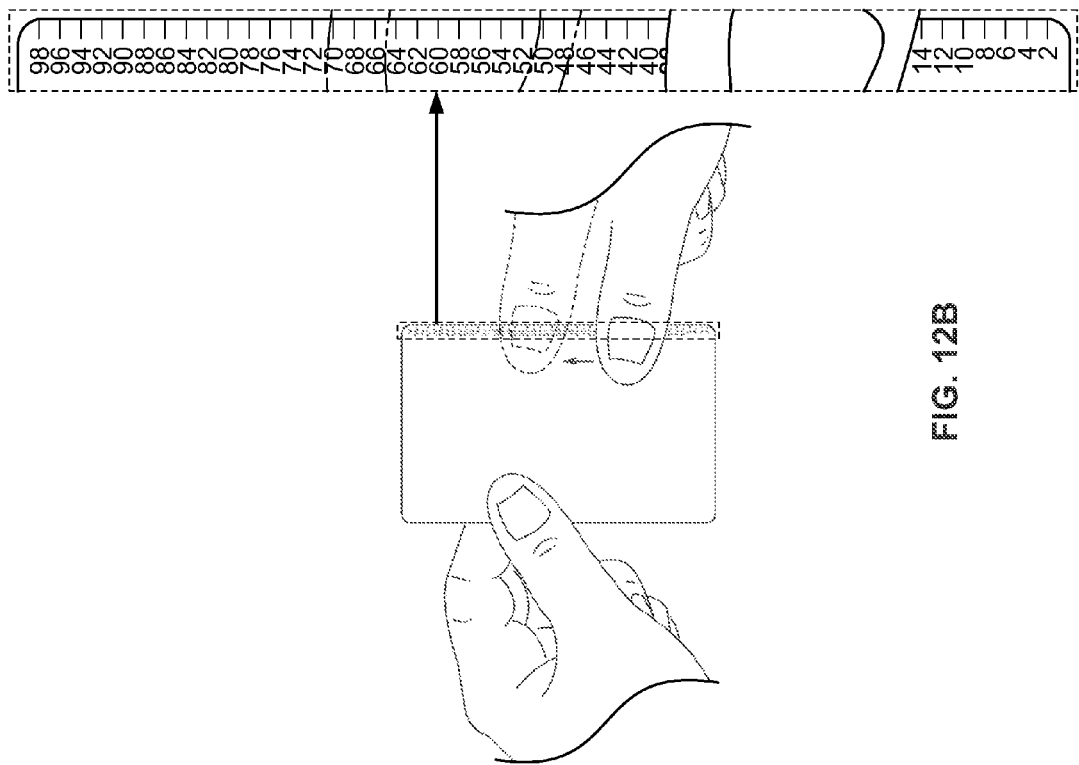
FIG. 12B is a front view of the card of FIG. 1A depicting the card user's left hand grasping the card while the card user's right hand thumb is sliding along the margin of the card in order to place the thumb underneath a specific amount of money due.
Figure 12A:
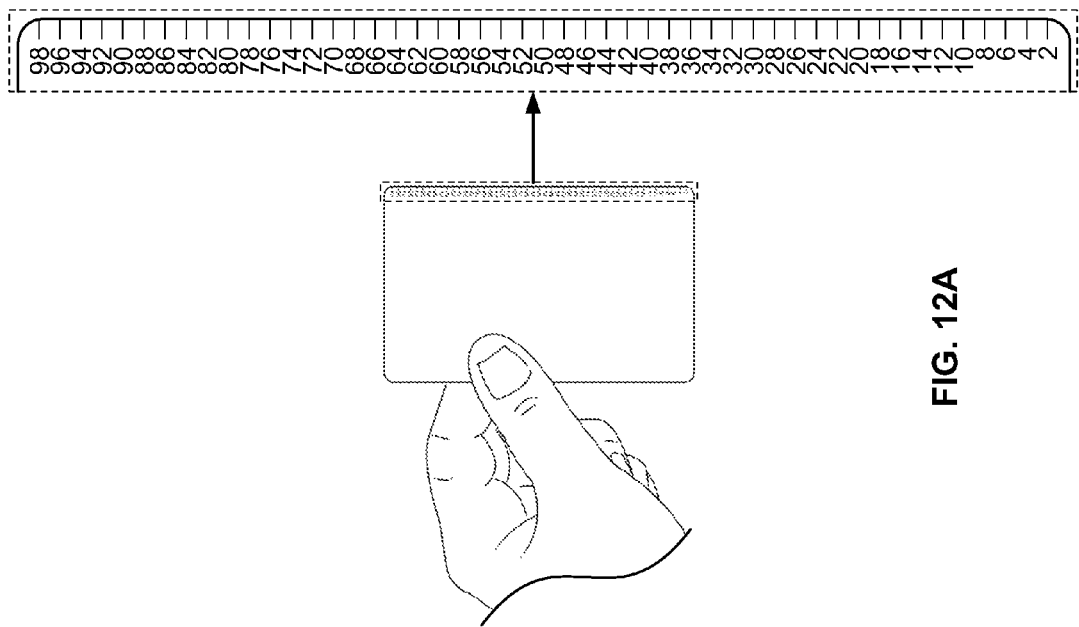
FIG. 12A is a front view of a card showing a card user's left hand grasping the card of FIG. 1A.
Figure 12E:
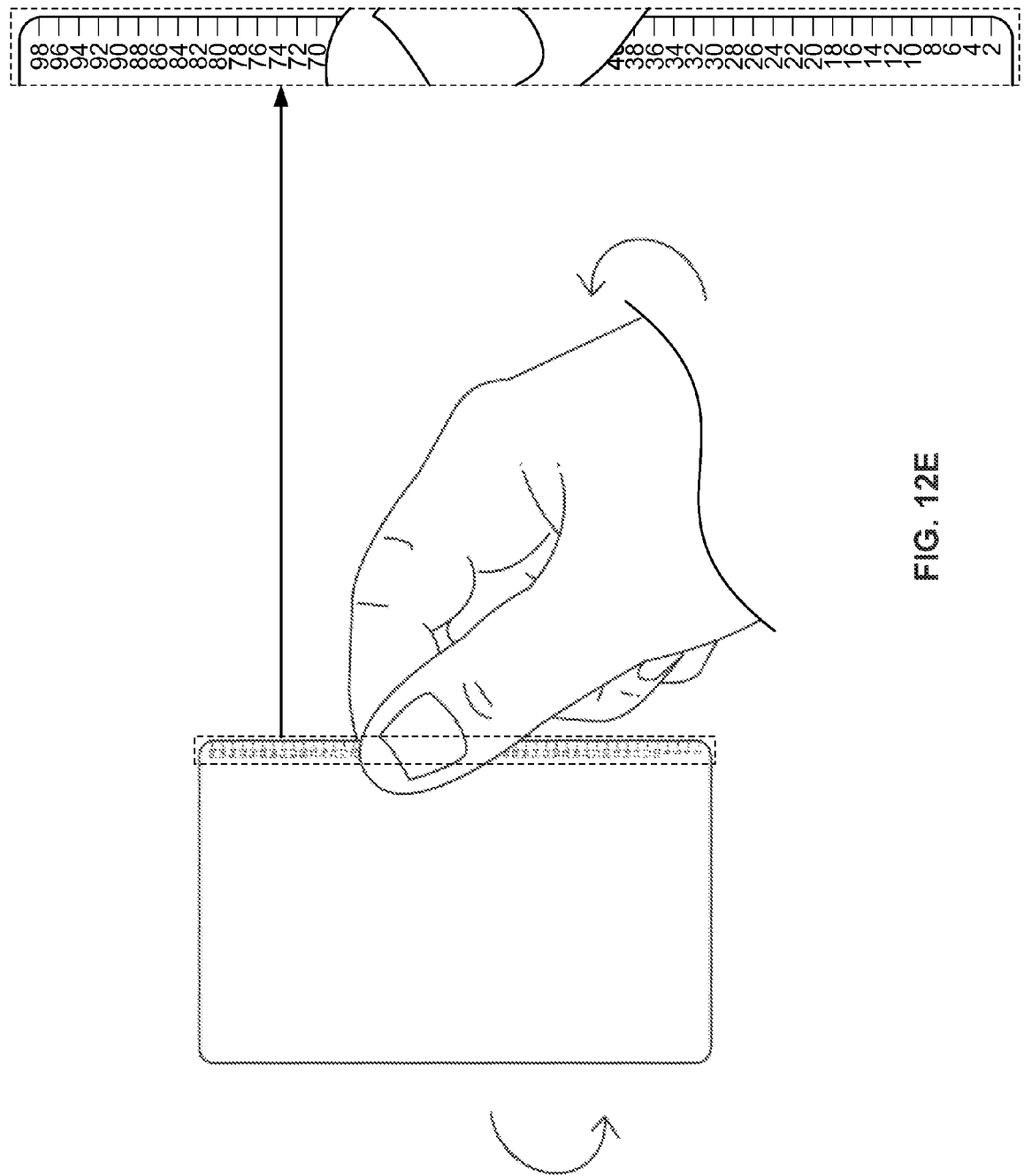
FIG. 12E depicts a motion the card of FIG. 1A undergoes when the user has placed his or her thumb underneath the amount of money due. As shown, the user is about to flip the card over to view the indicators on the back of the card in order to determine the appropriate gratuity.
Figure 12G:
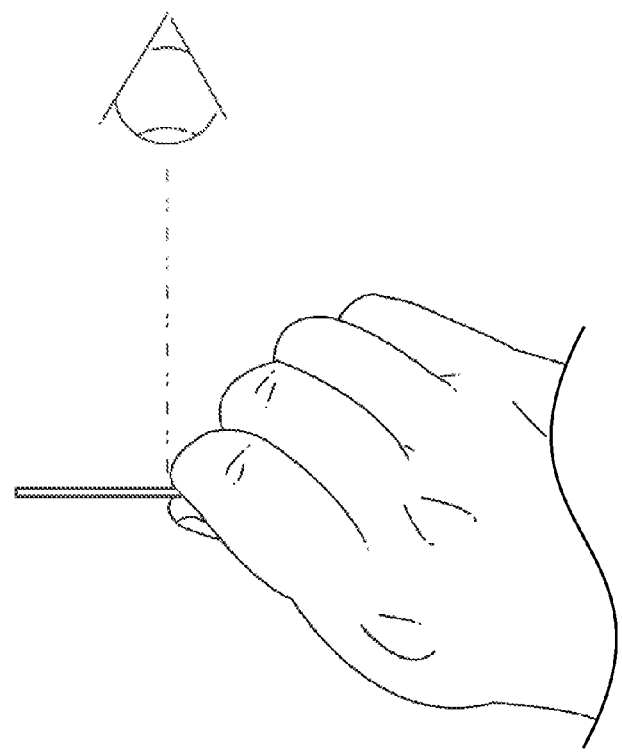
FIG. 12G shows the card user's viewing of the gratuity number from FIG. 12F.

One example of instructions that can be provided to a consumer include advising the consumer to grasp the card with a thumb and an index finger (see FIG. 12A); slide a thumb along the printed indicators on the card to locate the closest cost-representative number representing the cost (see FIG. 12B); view the printed indicator or cost-representative number on the surface of the card above where the thumb is placed (see FIG. 12D); then turn the card over without moving the thumb and index finger (see FIG. 12E); and view the printed indicator or gratuity number on the back of the card above where the index finger is placed (see FIG. 12G). The gratuity number represents an appropriate tip or gratuity amount.

Figure 12F:
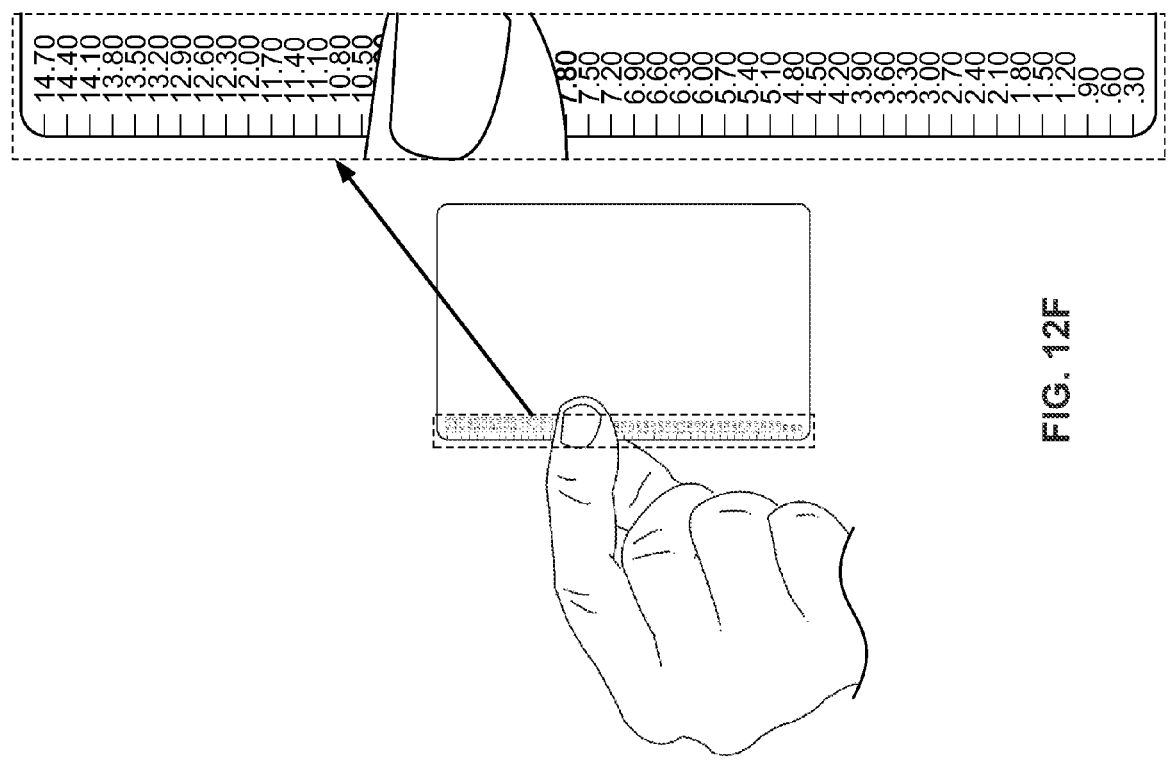
FIG. 12F shows the user's index finger underneath the appropriate gratuity number after the card of FIG. 1A was turned over in FIG. 12E.
Figure 13A:
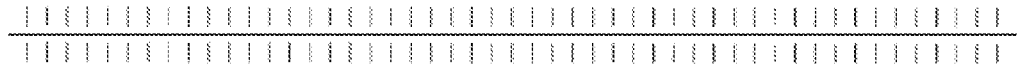
FIGS. 13A through 13F depict alternative schematic representations of the indicators of the tipping guide along a horizontal line, wherein the horizontal line denotes the edge of a transaction card in a 2-dimensional side view.
Figure 13B:
Figure 13C:
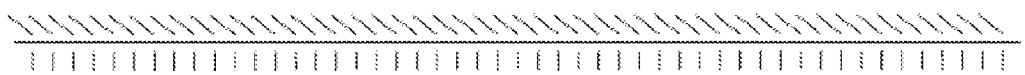
Figure 13D:
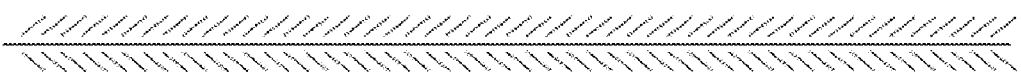
Figure 13E:
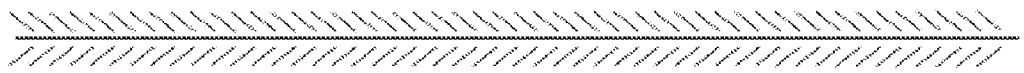
Figure 13F:
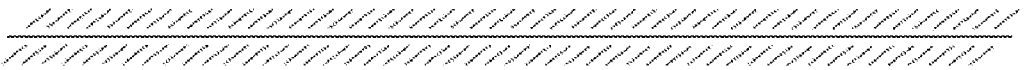

FIG. 12A depicts a user holding one embodiment of the transaction card with his left hand. The transaction card is shown from a front view. The transaction card has imprinted (printed, etched, embossed, affixed. etc.) thereon a set of cost-representative numbers including indicators placed in the margin immediately adjacent to the bottom edge of the card (i.e., the outer area of the front card surface). In practice, the left or right hand of a user holds the card in order to stabilize it so that the user can locate the cost-representative number by using the other hand. FIG. 12B depicts a user holding the transaction card with his left hand while sliding the thumb of his right hand along the top of the cost-representative numbers which are depicted in decreasing order of sequential increments of even integers from 98 to 2. As shown in FIG. 12B, the sliding thumb is lined up substantially perpendicular to the edge of the card on top of the cost-representative numbers. The user then slides his thumb as depicted by the arrow along the margin of the card until his thumb is situated immediately below a particular cost-representative number that represents a monetary amount due as typically shown on a bill (see FIG. 12C). The user's thumb acts as a control mechanism as he slides along the cost-representative numbers along the margin of the card (i.e., the outer area of the front card surface). In FIG. 12C, the exemplary cost-representative number "70" is used as an example to represent a hypothetical diner's bill of "$70.00". In addition, FIG. 12C depicts the user from FIG. 12A holding the transaction card with his right hand while his thumb is now situated exactly below a particular cost-representative number that represents a monetary amount due as typically shown on a bill. The transaction card is shown here from a front view. As shown in FIG. 12E, the user then rotates the card in space, pivoting on an axis of the user's wrist. This rotation occurs until the opposite or back side of the card appears within the visual field of the user, as shown in FIG. 12F. FIG. 12F depicts the user from FIG. 12E holding the transaction card with his right hand after having turned the transaction card over (i. e., rotated the card) such that his index finger is now situated exactly below a particular gratuity number that represents the percentage of the corresponding cost-representative number. The transaction card is shown here in back view as the user is holding the card. FIG. 12D depicts a user holding a transaction card wherein the transaction card is shown from the side view while the user is viewing the cost-representative number. Similarly, FIG. 12G depicts a user holding a transaction card wherein the transaction card is shown from the side view while the user is viewing the gratuity number.

The alignment of the cost-representative numbers with respect to the gratuity numbers is opposite across the edge of the transaction card. As shown in FIG. 1C, the cost-representative numbers and gratuity numbers meet near the edge of the card which is represented here by a horizontal line. However, the angle of the cost-representative numbers with respect to the gratuity numbers can be any desirable angle. FIGS. 13A through 13F depict alternative schematic representations of the indicators that make up the tipping guide. The horizontal line represents the 2-dimensional edge of the transaction card as viewed from the side. The smaller markings represent the indicators on the front and back of the transaction card. The indicators of the tipping guide on a transaction card can face each other at various angles as shown in the Figures here so long as the indicators line up in the middle, i.e., on the horizontal line that denotes the edge of the card from a side view. In various embodiments, the cost-representative numbers and gratuity numbers (indicators, etc.) can be arranged or presented in a variety of ways to differentiate themselves including different increments, colors, sizes, shapes, materials, fonts and the like.

Figure 14A:
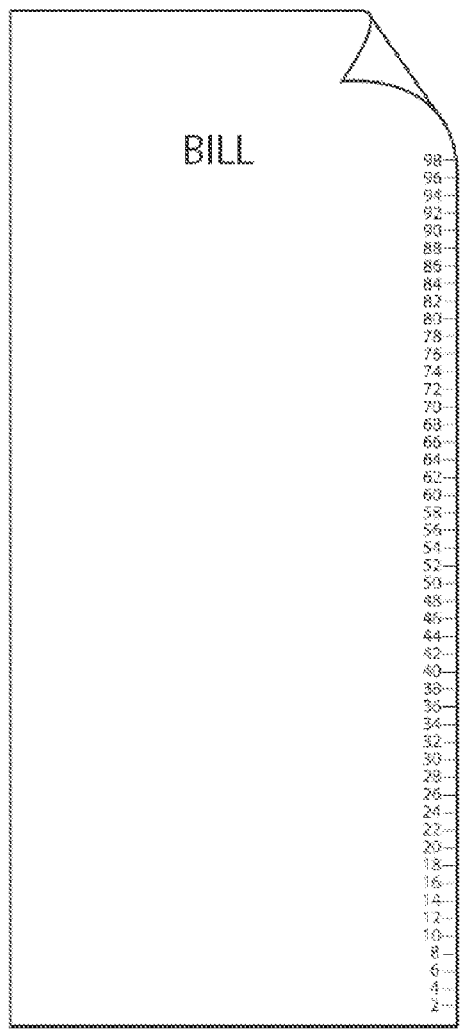
FIG. 14A illustrates the front side of a restaurant bill according to one embodiment.
Figure 14B:
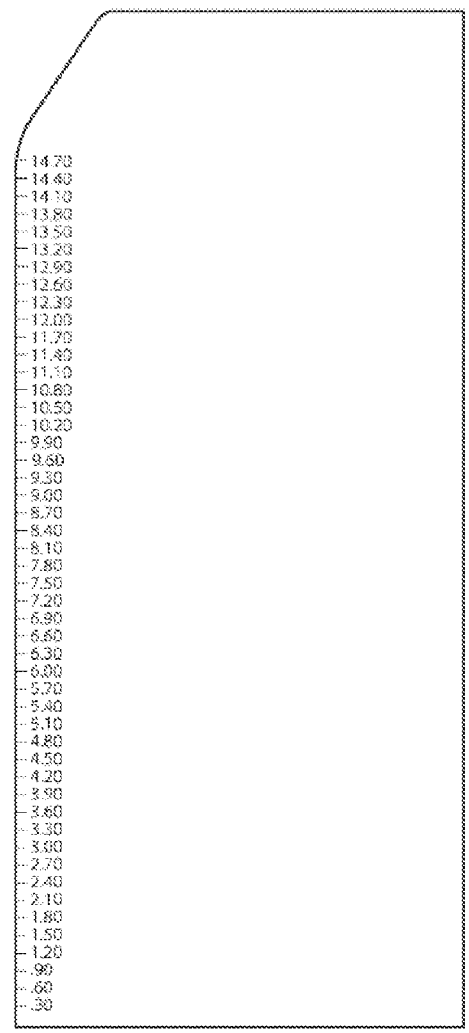
FIG. 14B illustrates the back view of the bill shown in FIG. 14A.

In some embodiments, the indicators described herein are incorporated with a bill that is presented to a user. FIG. 14A illustrates the front side of a restaurant bill according to one embodiment. FIG. 14B illustrates the back view of FIG. 14A. As shown in FIGS. 14A and 14B, a mark can be made on the bill at the location of the cost-representative number that represents the amount due. The user then flips the bill over while maintaining the spatial orientation in accordance with the markings The tip amount corresponds to the cost-representative number chosen by the user. The tipping guide shown can be printed on demand (with the rest of the bill) and can also be pre-printed (e.g., the restaurant can use pre-printed receipt tape that incorporates the indicators described herein).

In an alternative embodiment, the use of the tipping guide is combined with the bill pocket that is presented to the user as shown in FIGS. 15A and 15B. FIG. 15A shows a bill pocket complete with bill. In the example shown, the tipping guide is incorporated directly into the bill pocket, as shown here on the left hand side. FIG. 15B shows a partial view of the same bill pocket from FIG. 15A from the outside. As in FIG. 15A, the bill pocket shows the incorporated tipping guide. The user flips the bill pocket over to determine the gratuity amount. The tip amount corresponds again to the cost-representative number chosen by the user.

III. EXAMPLES

Example 1

A consumer named James uses a credit card with incorporated tipping guide in an upscale cocktail bar after he receives his bill. He views his credit card by inconspicuously holding the credit card with two fingers (see FIG. 12A) and quickly slides his thumb along the outer area of the credit card to match the cost of his bill (see FIG. 12B). At the appropriate cost-representative number (i.e., the cost-representative number matching the cost of the bill), he places his thumb underneath that number on the front of the credit card and places his index finger at the same place on the back of the card (see FIG. 12C). James then views the cost-representative number (see FIG. 12D). Now James quickly flips the card over (see FIG. 12E) to view the gratuity number which represents the desired percentage of the cost-representative number (i.e., the actual cost of the service or item rounded to the nearest number that is divisible by 10) (see FIG. 12F). Briefly, James views the appropriate gratuity number (see FIG. 12G). Suppose James spent $68.00. He rounds to $70.00 (see FIG. 12C) resulting in a 15% tip of $10.50 (see FIG. 12F). James swiftly completes the signing of the bill plus tip.

Example 2

In another example, Jill Doe who works as a physician in a hospital carries her employee badge all day due to hospital restrictions. During her lunch hour, Jill frequently visits the hospital cafeteria, and if time permits, the neighboring medical museum where lunch tours are led by self-employed tour guides on commission. Jill has a tipping guide incorporated into her employee badge holder (1602) that holds her hospital identification card (1604). The tipping guide appears along the outer edges or outer areas of the badge above the rubberized edge such that Jill can conveniently calculate a tip when she visits the cafeteria where she lunches and then the museum where she takes part in guided tours. Suppose visitors to the museum are expected to pay at least a 30% tip on top of the museum admission price and that admission to the museum costs $6.00. Jill is able to determine that a minimum tip of $1.80 should be paid to the guide by sliding her thumb along the cost-representative numbers (1606) until she gets to 6 and then turns the card over to view the gratuity-representative number (1608) where 15% is depicted as 90 cents which Jill doubles to get to a $1.80 tip. In this embodiment, the badge holder incorporates the tipping guide while the badge can hold any desirable card such as an identification card, access card, credit card and others.

Example 3

In another example, Sandrine, an actress and ballerina, is a star in a Broadway show.

The theater has tight security due to overzealous fans and every actor carries a security card that doubles as an access card to enter the secured theater building. Sandrine has numerous assistants and helpers to get ready for each show due to her lavish costumes that change after every scene in which she appears during the play. When Sandrine is not dancing on stage she moves about the theater and carries her security or access card that incorporates a tipping guide along the outer edges or outer areas of the card. In addition, the card with tipping guide includes a dial and attached pointer that assists Sandrine in determining tips (see FIGS. 9A and 9B). Since Sandrine is a bit short-sighted and unable to see perfectly without glasses or contact lenses she appreciates the plastic dial and pointer that help her determine a tip quickly and easily. Sandrine uses her tipping guide throughout the day in order to pay tips to her many personal assistants that deliver her lunch and snacks, tend to flowers sent by admirers, and run her personal errands. Since Sandrine carries her access card with a tipping guide at all times she can conveniently show her card to security personnel and simultaneously determine a tip for her assistants.

Example 4

On occasion, Sandrine lunches with co-actors, directors or theater staff in a nearby restaurant where she uses a meal voucher card that the theater provides to theater personnel. Recently, Sandrine's co-star, James, acquired a meal voucher card with a tipping guide on the outer areas of the card. James has added to the card a slider with a magnifying glass to assist him with determining tips (see FIGS. 10A and 10B). The magnifying glass is enclosed in a plastic border that allows James to simultaneously slide along the cost-representative numbers of the tipping guide on the voucher card while viewing the numbers through the magnifying glass (as in FIGS. 10A and 10B). Once he arrives at the desired cost-representative number, he then turns the card over to read the gratuity amount via the magnifying glass.

When James dines, he often tips at a standard 15 percentage rate. When the service is particularly good he sometimes tips at 30 percent. Suppose James's meal is nearly $68.00 Dollars due to an expensive glass of Champagne. James rounds his bill to $70.00 and slides his magnifying glass along the cost-representative numbers until he arrives at 70. He then turns the meal card over and views the 15 percent gratuity number that corresponds to the cost of the meal which is $10.50. Since James feels particularly generous today he decides to double the amount and tips at 30 percent instead.

Example 5

Figure 17A:
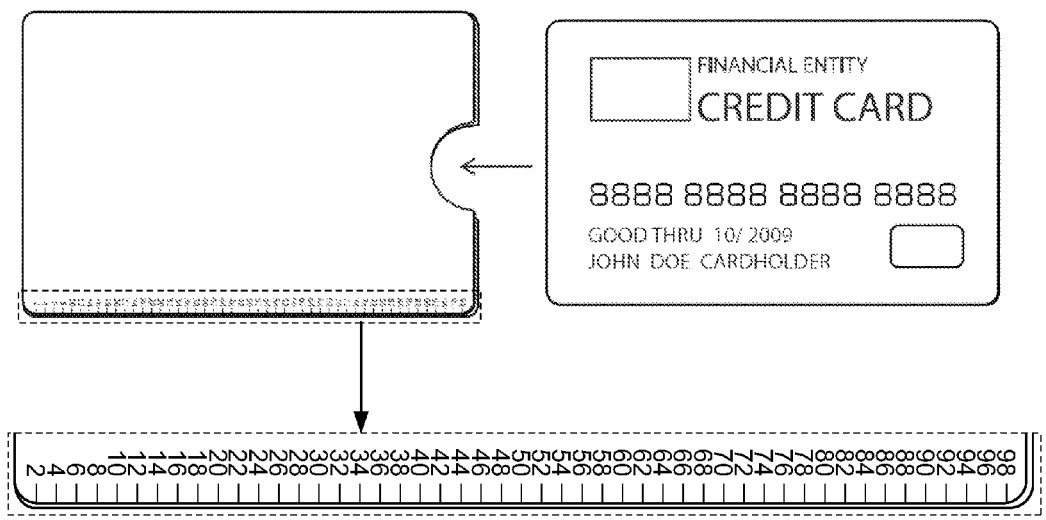
FIG. 17A depicts a front view of an example of a transaction card such as a credit card that is about to be placed inside of a sleeve.
Figure 17B:
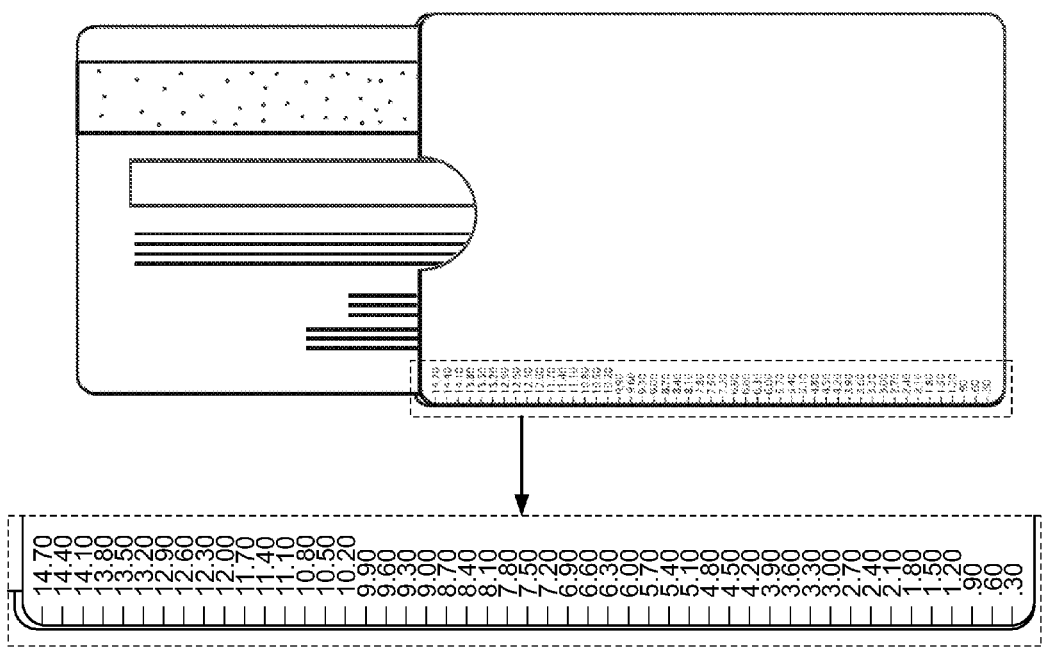
FIG. 17B depicts a partial back view of the card of FIG. 17A as the card slides into the sleeve.

Lenore works behind the scenes for a famous New York photography studio where she assists during the photo shoots or travels to or from photo shoots. Lenore carries her credit card in a sleeve to prevent it from demagnetizing. She keeps the sleeve in her cardigan since she constantly deals with personnel that either attend the photos shoots, bring supplies to the photo shoots, or run errands for the photographers or the models. Lenore has opted to carry her credit card in a sleeve in her pocket because she uses her credit card so many times during the day that it needs to be handy and available at ail times. Being fastidious, Lenore still wants her credit card to be protected without carrying a purse or a wallet. The sleeve includes an incorporated tipping guide (see FIGS. 17A and 17B). Lenore constantly tips people either via cash or credit card and uses her tipping guide throughout the day. In fact, Lenore has an excellent reputation as a tipper because she never errs in determining the appropriate gratuity amounts for her assistants. FIG. 17A shows Lenore's transaction card and next to it a sleeve incorporating a tipping guide. In some embodiments the sleeve is transparent.

Example 6

Jeremy works as an investment banker and carries multiple credit cards in his wallet. His favorite credit card has a tipping guide incorporated which is immediately visible when Jeremy opens his wallet (see FIGS. 3A and 3B). Jeremy likes that credit card so much that he has obtained a sticker that can be applied to his other credit cards (see FIGS. 11A-11C) to make them function as the credit card with the integrated guide. In some embodiments, the sticker is removable and repositionable, so that, for example, Jeremy can apply the sticker to various cards and remove them if he so desires. Jeremy also recommends to a hotelier in whose hotel he holds a sizeable investment that the hotel should consider a bulk purchase of such stickers and apply them to all of their magnetic room keys. Jeremy believes that visitors will like the cards so much they will keep them in their wallets long after they have checked out of the hotel, and thus be reminded favorably of the hotel chain every time they open their wallet.

Example 7

An accountant named Lisa approaches a checkout counter at her favorite local bookstore and notices that a long-existing product display featuring traditional tip tables has been replaced with a small kiosk featuring unusual-looking stickers. Attracted by anything new involving numbers, Lisa makes a closer inspection and is intrigued and impressed that the new stickers are intended to be placed on transaction cards for purposes of calculating a gratuity (see FIGS. 11A, 11B and 11C). She hands one of the inexpensive stickers to the cashier for purchase. She then reviews available transaction cards in her wallet, and resolves to place the sticker on her debit card so as to avoid defacing any of her credit cards, which she has historically preferred because they allow her to accumulate and meticulously track loyalty rewards points. After paying with the debit card (because it is already in her hand), Lisa detaches the wax paper backing from the sticker and affixes the sticker to the card (see FIGS. 11A and 11B), wrapping it around the bottom in accordance with instructions printed on the backing (see FIG. 11C).

As she heads towards the store exit, she spots several fellow accountants in line at a coffee lounge contained within the bookstore. Eager to try out her new device and impress the other accountants, she gets in line and buys a jar of chocolate-covered espresso beans and a double cappuccino using the debit card. Before replacing the debit card in her wallet, she calculates a gratuity using the device immediately after the barista hands it back to her. Knowing that she could make the calculation discreetly using the device, she chooses instead to conspicuously flip the device in an exaggerated act of showmanship. She then places cash in the amount of the calculated gratuity into a tip jar sitting on the counter. The other accountants, now curious, ask her for an explanation of the device. Upon hearing the explanation, the other accountants purchase their own stickers. Seeing the sticker-covered edge of the debit card every time she opens her wallet, and thereby reminded of the positive attention she was able to receive with the debit card, she begins using her debit card more frequently. After finally receiving in the mail a replacement debit card that offers loyalty rewards, she buys a new sticker, affixes it to the new card, and ultimately uses her debit card more frequently than any other card.

Example 8

A patron named Enzo opens a bar tab at the beginning of a fun-filled night. He opens his wallet in search of a payment method to secure his bill and notices, among other available cards, a semi-transparent credit card with notches and numbers along its edge (see FIGS. 5A and 5B). Remembering that this particular card helps him to calculate a gratuity conveniently, he hands this card to the bartender, who retains the card while the Enzo enjoys a few beers. When Enzo is ready to pay, the bartender processes the payment transaction and returns the card to Enzo with a receipt containing a blank line for a tip. Not being very good at math, Enzo has historically paid his tip in cash, figuring that by leaving a few dollars in cash, he wouldn't have to worry about getting the amount right. Enzo decides to double check whether his usual tipping scheme is fair by using the integrated tipping guide offered by his card. Enzo reviews the bill and then rounds this amount up to the nearest even number. He holds the card up to eye level with his left hand (as in FIG. 12D) and locates a notch corresponding to the rounded amount printed on the front of the card (as in FIG. 5A). Enzo then places the end of his right index finger in the notch and holds it there, flips the card (as in FIG. 12E), and reviews a tip amount (as in FIG. 12G), conveniently printed on the bottom margin of the back of the card, that corresponds to the notch in which the end of his finger lies. Enzo discovers that he has been undertipping for years. He writes an extra generous tip amount on the transaction receipt, and vows to use the tipping guide from now on.

Enzo then calls a cab, and when he arrives at his destination—a comedy club, he asks the driver for the cab fare amount, calculates the tip in the same manner as he had done at the bar and asks the driver to add the tip amount to the fare. He hands the same card to the driver for payment. The driver completes the transaction, and Enzo leaves the cab and enters the club. The club only accepts cash payments. However, Enzo is able to compute accurate tips for the snacks and drinks he consumes by using the techniques described above—even though he is paying cash.

Example 9

Chantalle who visits an athletic club in Paris and changes into her workout clothes in the women's locker room. Not wanting to carry her burdensome personal belongings into the fitness studio, she places these items in her locker, closes the locker door, secures the locker with a key-locked padlock, and places the key in her pocket. The key includes an incorporated tipping guide along the edge of the key (see FIGS. 8A and 8B for an example key). After completing her workout, she heads toward the locker room, stopping by a food counter for a fruit smoothie and a vegetable wrap. Not having her purse or wallet on her person, she pays her bill by telling the attendant her membership number, which she has memorized. The bill includes a blank space in which she may write a tip amount (in Euros). She retrieves her padlock key from her pocket and holds it vertically from the top in her left hand (see FIG. 8A). She holds the key up to eye level with her left hand and locates the rounded up cost for her snack printed on the front of the key (as in FIG. 8A). Chantalle then places the end of her right index finger at the key and holds it there, flips the key, and reviews a tip amount (as in FIG. 8B) that is printed on the bottom margin of the back of the key (i.e., corresponding to where her index finger lies). She enters the tip amount on the transaction receipt.

Example 10

In a restaurant a patron named Mr. Jones receives a bill after completion of a meal. The party consists of business people that are discussing an important business deal and the paying patron Mr. Jones has neither time nor opportunity to use a hand-held tip calculator. Mr. Jones also wishes to avoid embarrassing himself in front of the group of potential investors since a favorable image is crucial to the completion of the deal. Therefore, he provides his credit card with incorporated tipping guide (see FIGS. 1A and 1B) to the server, and when the server returns with the card and credit card receipt, he conveniently and easily calculates the tip while viewing his credit card by inconspicuously placing his thumb underneath the cost-representative number (see FIG. 12C) corresponding to the bill amount rounded up on top of the edge of the credit card and placing his index finger at the same place on the bottom of the edge of the card (see FIG. 12D). Mr. Jones is now holding the credit card with two fingers and quickly turns it over (see FIG. 12E) to view the gratuity amount (see FIGS. 12F and 12G), which represents the monetary amount corresponding with the desired percentage of the cost-representative number.

Suppose Mr. Jones's tip guide only ranges from $0-$100 and his bill is $210. First, he looks for the cost-representative number that is equal to the rounded number on the front of the credit card over and above the any 100 Dollar increment ($10) and determines the appropriate tip for that amount ($1.50), then adds $15.00 for each $100 increment ($30) for a total tip of $31.50).

As another example, suppose Mr. Jones is with a large group of diners and that the restaurant has a stated policy of charging 15% gratuity automatically for large parties. When the bill arrives (for $575.75), Mr. Jones decides to verify that the tip amount added by the restaurant is correct. Using the techniques described herein, Mr. Jones is able to easily verify that the restaurant added the correct amount of gratuity without drawing attention to himself.

Example 11

The gratuity amount can also be set at a different amount than the traditional fifteen percent. For example, a card can include a tipping guide for a 20 percent gratuity. In this example, if a patron like Mr. Jones holds his thumb underneath 20 (representing a $20.00 restaurant bill) on the front of the card, his index finger on the back of the card will underlie the amount of $4.00, which is 20 percent of 20.

Example 12

A young couple is backpacking through the countryside of Europe and stops at a restaurant for a meal. At the end of the meal a bill of 88 Euros arrives. The couple decides to split the bill. Susan pulls out a travelers' check that includes a set of cost-representative numbers from 1 to 100 in increments of one that are evenly spaced along the bottom edge of the front face of the travelers' check. She calculates a 15% gratuity by holding her check in her right hand and sliding her left thumb alongside the bottom of the check until the thumb stops next to the cost-representative number of 44 Euros. She holds the travelers check in a pincer grasp with her left hand. Susan than turns the traveler check over to bring the back side into her field of view. She sees that the corresponding gratuity amount is 6.60. Thus, she adds 6.60 Euros as a gratuity to her bill.

Example 13

A passenger in a taxicab named Tony arrives at his desired destination. As Tony reaches for his wallet the cab driver hands him a business-card sized business expense receipt for the cap ride. The receipt has on its edge cost-representative numbers from 1 to 50 in increments of one that are evenly spaced along the bottom edge of its front face (similar to the bill shown in FIGS. 14A and 14B). The back face of the receipt shows corresponding gratuity numbers. Tony uses the receipt to calculate the appropriate gratuity for the cab fare by selecting the cost-representative number that corresponds to the cab fare. He then turns the receipt over to locate the corresponding gratuity number that corresponds to a 15 percent tip.

Example 14

A patron of a pub in London named Miles is handed a bill that includes a 10 percent service charge. Miles requests that the waitress explain this amount. The waitress explains that this service charge is included for the benefit of the pub and only a small fraction thereof is given to her. In response, Miles requests that the 10 percent service charge be taken off the bill. He then uses his credit card that includes a three dimensional tipping guide. The tipping guide shows cost-representative numbers from 1 to 101 evenly spaced in odd number increments on the front side margin and shows corresponding 12.5 percent gratuity numbers on the back side margin along the same edge of the card. The numbers are composed of glow-in-the-dark ink which allows for easy viewing in the dark pub. Miles slides his finger along the front face of the card until he finds the amount nearest to the cost shown on the bill. He then flips the card over to determine the appropriate gratuity. Miles then hands this amount in cash to the waitress. The waitress' face lights up as she pockets this tip and then goes to the cash register to change the bill in order to remove the service charge.

Example 15

Figures 18A, 18B, 18C:
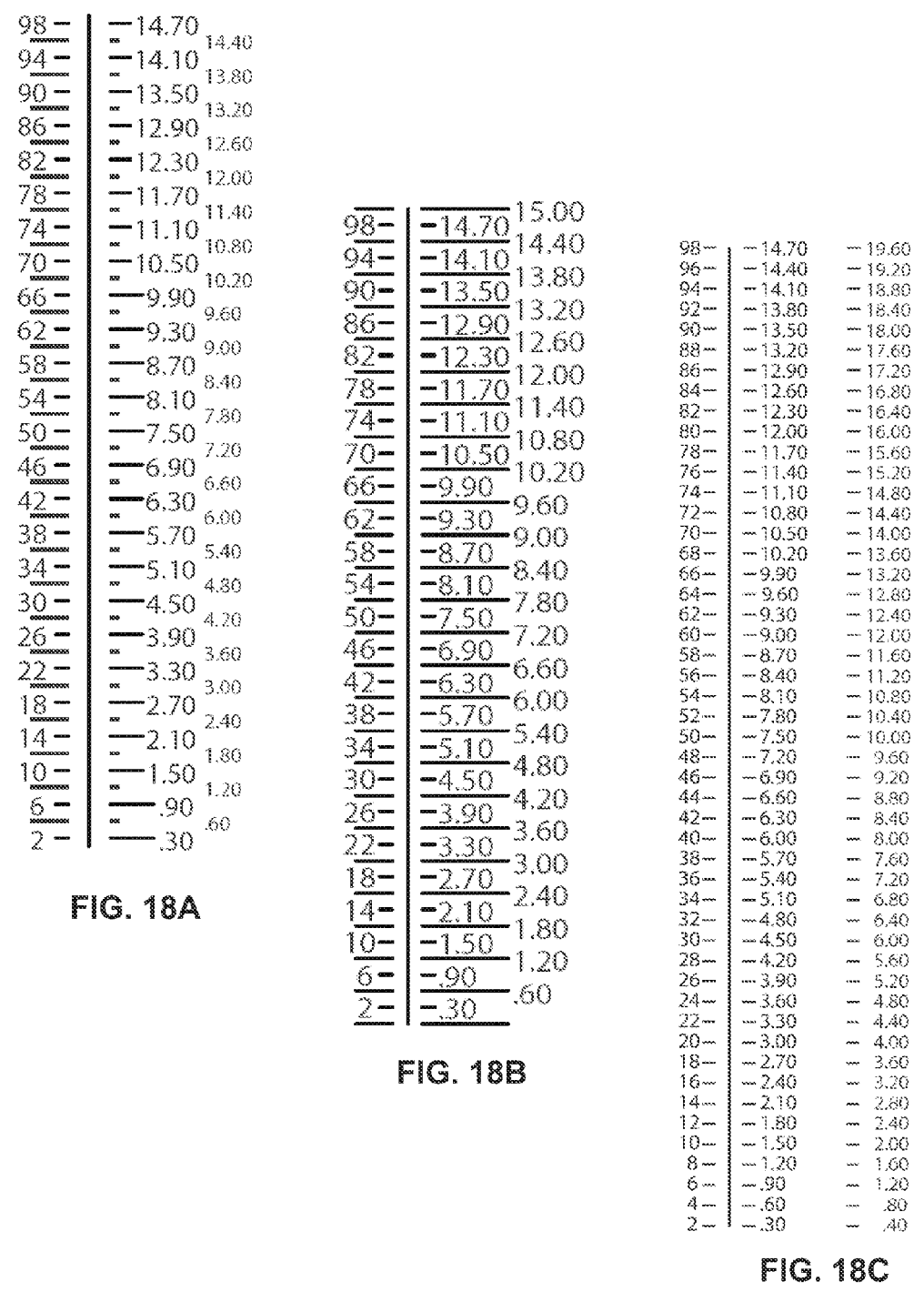

A recently made-famous novelist named Eric arrives in Jamaica to vacation at a nice resort in order to escape the stress of a recent book signing. He checks in at the front desk and is given a hotel room key card that includes a three-dimensional tipping guide (see FIGS. 4A and 4B). This card includes indicia with a hotel logo and printed along the bottom is a tipping guide. In addition, the card is shaped like a swan which Eric finds intriguing since he noticed the artificial swan lake right in front of the Hotel. The set of cost-representative numbers in the tipping guide match the local currency of Jamaican Dollars. The vacationing novelist leaves his hotel room to walk down to the pool, carrying only a swimsuit, sandals, a towel, and his hotel room key card. While at the pool Eric orders two strawberry daiquiris. When the bill arrives he uses the hotel room key card that includes the three dimensional tipping guide in order to determine the proper tip. He enters the correct tip in local currency on the gratuity line and signs the bill to charge the full amount to his room. Alternatively, the hotel could issue a hotel room key card that has two columns with gratuity indicators rather than one column with gratuity indicators so that Eric could decide whether to tip 15 percent or 20 percent or any other percentage (see FIGS. 18A, 18B and 18C).

Example 16

John fills up his gas tank and pays by using his ministore key-chain magnetic strip card with incorporated tipping guide. Unbeknownst to John, using his ministore key-chain magnetic strip card entitles him to receive unexpected extra services for his car. Today, John is offered an extra cheap hand-wash for his car which John appreciates since he just returned from a trip to the Sierras and his car could certainly use a good scrub. A quick view onto his ministore key-chain magnetic strip card with incorporated tipping guide helps him to determine the appropriate tip for the car washing attendant.

Example 17

Alice is a businesswoman who uses the same corporate credit card for all her business meals since she can track her business expenses with it and her card also boasts a large colorful company logo splashed across its front side that she likes to show off to her clients. This card also includes the three dimensional tipping guide that she uses to conveniently determine the proper tip. At breakfast when the bill arrives she glances at the card while simultaneously talking with clients in order to locate the monetary amount that corresponds with her bill. Then she rotates the card and views the lined up gratuity amounts indicated on the back of her card. Alice chooses her gratuity from between two rows with indicia for amounts corresponding with fifteen percent gratuity and twenty percent gratuity (see FIGS. 18A, 18B and 18C). At breakfast she uses the three dimensional tipping guide to conveniently tip 15% of her bill since the breakfast wait staff service was adequate while at dinner Alice uses the same three dimensional tipping guide to conveniently tip a 20% of her bill since the dinner wait staff was superb.

Example 18

A family from Beijing, China visits the city of San Francisco, Calif. and dines at a restaurant in the city's Chinatown district. After the meal, the waiter delivers a bill to the father and gives each family member a fortune cookie, which is an edible cookie containing a slip of paper with preprinted content such as a short foretelling message or a set of lottery numbers. Having spent little time outside of China, the family is not familiar with the fortune cookies, which are believed to be an American creation and are not widely consumed within China. Unsure of American tipping customs, the father struggles with the bill for a moment. Embarrassed by his failure to research the topic earlier, he hesitates to ask the waiter for help, but finally does so. When the waiter tells him that a baseline customary tipping percentage in America is 15%, which far exceeds the Chinese custom, the father wonders whether the waiter is trying to take advantage of him. After an awkward moment, the father's daughter holds up the paper insert from her fortune cookie, and shows it to her father. The father inspects the paper and sees that the paper includes a tipping guide wherein printed indicators appear on both side of the paper (see FIGS. 19A and 19B). Upon closer inspection, the father realizes that this piece of fortune incorporates a tipping guide with cost-representative numbers on the front face of the paper that correspond to 15 percent gratuity numbers on the back face of the paper. The father is relieved as he realizes how the tipping guide simplifies the gratuity calculation. The father slides his finger along the front face of the paper until he finds the amount nearest to the cost shown on the bill. He then flips the paper over to determine the appropriate gratuity. The father then adds this amount to his bill and leaves the appropriate cash on the table.

Figure 20:
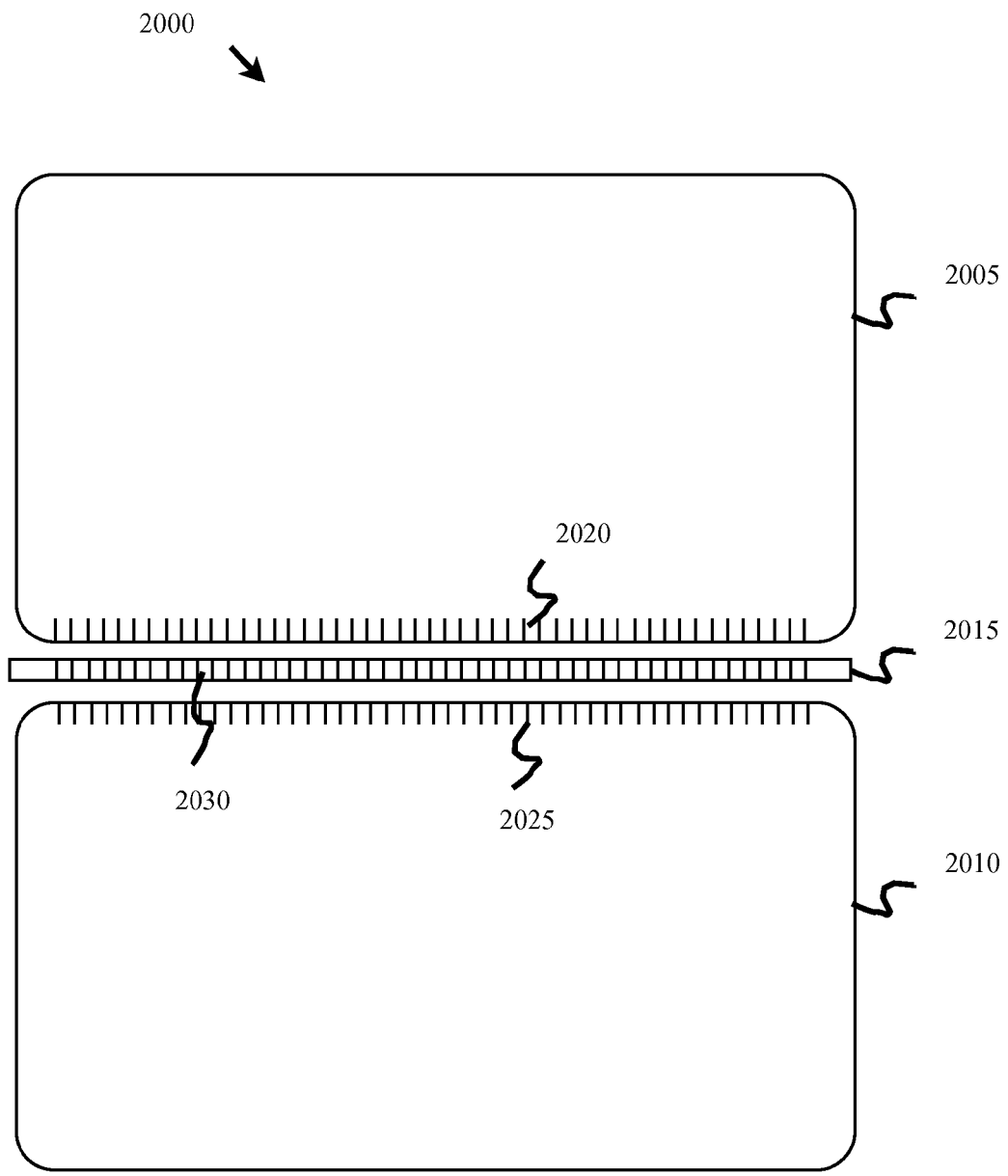
FIG. 20 shows front, side, and back views of an exemplary transaction card showing a lateral edge of the card with a set of indicia extending between each of a number of financial amount indicators visible from a first side of the card and a corresponding number of gratuity indicators visible from a second side of the card.

FIG. 20 shows front, side, and back views of an exemplary transaction card showing a lateral edge of the card with a set of indicia extending between each of a number of financial amount indicators visible from a first side of the card and a corresponding number of gratuity indicators visible from a second side of the card. In this example, a transaction card 2000 has a front surface 2005, a back surface 2010, and a lateral edge surface 2015 that extends between the surfaces 2005, 2010. The front surface 2005 and the back surface 2010 may each be substantially planar and arranged to lie in substantially parallel planes. When viewed from the front surface 2005, a number of textual indicators 2020 representative of a number of financial amounts are visible. When viewed from the back surface 2010, a number of textual indicators 2025 representative of a predetermined percentage of the corresponding financial amounts are visible. As the card 2000 is rotated with the lateral edge surface 2015 in view, any of the indicators 2020, 2025 can be seen to be registered or connected to its corresponding indicator on the opposite surface by visually following one of the indicia 2030 extending between the two opposing indicators. Accordingly, the indicia 2030 may advantageously aid the user to visually and accurately determine which gratuity amount corresponds to a selected financial amount, or vice versa, as the view of the card is shifted from front to back or from back to front. During such a shift of perspective, the indicia 2030 on the lateral edge surface 2015 may be in view simultaneously with at least one of the indicia 2020, 2025.

The indicia 2030 on the lateral edge surface 2015 may provide a visual reference to aid the user in determining which financial amount indicator 2020 is associated with which gratuity indicator 2025. As an illustrative example, the user may select a financial amount for which a gratuity must be determined. The user identifies one of the indicators 2020 that corresponds to the financial amount of interest. As the card 2000 is rotated, the user may visually identify one of the indicia 2030 that is registered and thus corresponds to the selected financial amount indicator 2020. As the card 2000 rotates further, the indicia 2025 on the back surface 2010 comes into the user's visual field as the front surface 2005 goes out of the user's visual field. The user may visually follow the identified indicator 2030 on the lateral edge surface 2015 until a corresponding indicator 2025 can be identified. The user may then determine the gratuity by reading the textual value (not shown) associated with the identified indicator 2025 that corresponds to the user-selected financial amount indicator 2020.

In some examples, the operations described, for example, with reference to FIGS. 12E-12F may be modified to be performed visually, such as without the aid of a finger or other supplemental aid or marker to associate corresponding indicia on opposite sides of the card 2000.

By way of example, and not limitation, the indicia 2030 on the lateral edge surface 2015 may be formed in some embodiments by material deposition, laser inscription, printing, heating, chemical staining, etching, painting, by the removal of a coating or substrate material, or by a combination of such methods to form a visual reference. In some embodiments, the card 2000 may be formed of a single layer of material (e.g., plastic), or multiple layers, including but not limited to two or three layers. In some implementations, a module (e.g., processor-based system) may be embedded or installed within the card amongst one or more layers.

Figure 21:
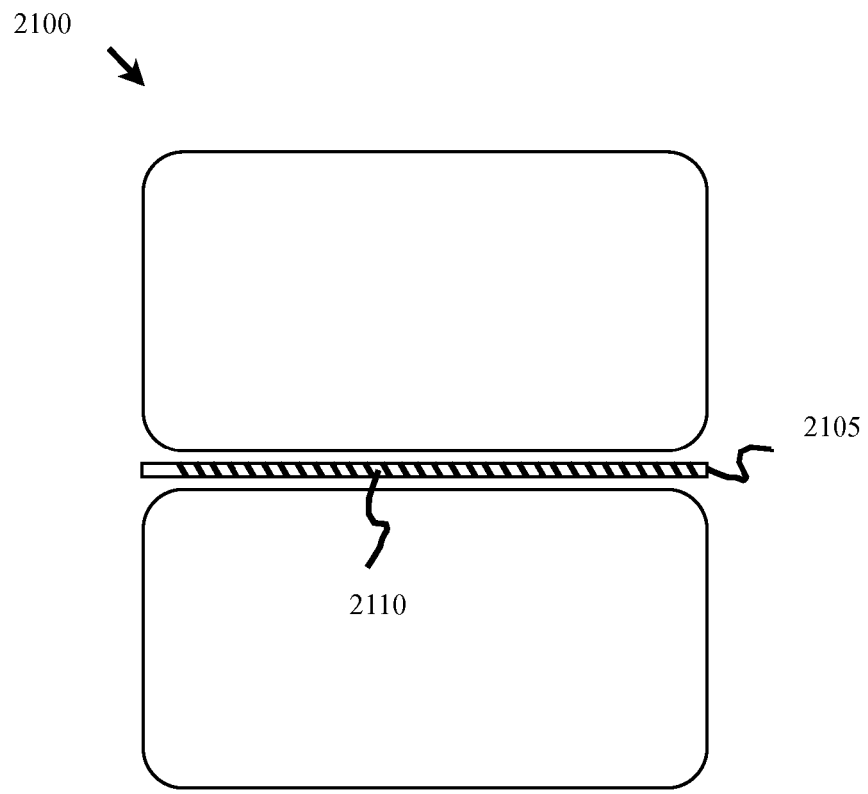
FIG. 21 shows front, side, and back views of an exemplary transaction card showing a lateral edge of the card with a set of indicia arranged at a non-perpendicular angle.

FIG. 21 shows front, side, and back views of an exemplary transaction card showing a lateral edge of the card with a set of indicia arranged at a non-perpendicular angle. In this example, a card 2100 includes a lateral edge surface 2105 with indicia 2110 extending between a first side of the card and a second side of the card. In this embodiment, the indicia 2110 include linear segments that lie along an axis that intersect a plane containing the front surface of the card 2100 at a non-perpendicular angle.

In some embodiments, the indicia 2110 include linear segments that are each visible on the lateral edge surface 2105. In some embodiments, the linear segments may include a visual indicator that extends substantially between at least 5% and 100% of the distance between the plane that contains the top surface of the card and a plane that contains the bottom surface of the card.

FIG. 22 shows top cross-section and end views of an exemplary transaction card embodiment fabricated to include at least three layers. FIG. 22(a) shows an exemplary top view of a card material substrate 2200 with an exposed core layer 2205. In this example, a sheet or web of material to form the core layer 2205 may be processed to include indicators 2210 that will be visible from a lateral edge of the card after it is completely manufactured. In some examples, ink or colored material (e.g., fibers, metallic strips) may be deposited in parallel to form the indicators 2210, as shown. The processing may include deposition, implantation, lithography, chemical etching, staining, mechanical removal, or other suitable process for defining visible indicators on a lateral edge surface of the finished card.

FIG. 22(b) shows an end view of a card being constructed to include a three layer lamination of the core layer 2205 with indicators 2210 between two plastic films 2215, 2220. After lamination, visual indicators (not shown) of financial amounts and corresponding gratuity based on one or more predetermined percentages of the financial amounts may be deposited on a surface 2225 and a surface 2230, respectively. The deposited indicia on the surfaces 2225, 2230 may be substantially registered with the visual indicators 2210, as described with reference to FIGS. 20-21. The visual indicators 2210 of this embodiment extend between the surfaces 2225, 2230 within the thickness of the core layer 2205.

In various embodiments, the transaction card 2000 may contain stored machine-readable information (not shown) in the form of embossed text, printed text, bar codes, magnetically encoded information, or a radio frequency identification module with a data store.

Although various embodiments have been described with reference to the figures, further embodiments are contemplated. For example, the tipping guide described with reference to FIG. 1B may incorporate indicia on the lateral edge surface as described with reference to FIGS. 20-22. Some embodiments may be further modified to alter the display of the tipping guide in response to user manipulations.

In an illustrative example, some embodiments may display the tipping guide only when viewed within a certain range of angles, such as when viewing both the top surface and the edge surface to which the tipping guide indicia is adjacent. When viewed straight on, the tipping guide may not be visible. The angles at which the tipping guide may be viewed can be determined according to a lenticular printing process used to manufacture the card.

In another illustrative example, the transaction card of FIG. 1B may be modified by a lenticular printing process in which, for example, two or more gratuity percentages can be selectively viewed on the back surface of the card by user manipulation of the angle of viewing. For example, the set of numbers displayed may be based on any predetermined percentage that is calculated for display. In one example, a lenticular printed back surface of the card may display gratuity values for 15% gratuity when viewed from a first angular range, 18% gratuity when viewed from a second angular range, and 20% gratuity when viewed from a third angular range. Each of the three gratuities of the preceding example may display a reference label for the applicable gratuity (e.g., 15%, 18%, 20%) as a reference to the user, and the user can select the desired gratuity percentage by controlling the viewing angle until the desired reference label is in view. In other examples, the number of gratuity levels available may be fewer (e.g., 2) or more numerous (e.g., 4, 5, 6, 7, 8, 9, or at least about 10).

In various embodiments, the use of lenticular printing processes on one or both of the front or back card surfaces may advantageously increase an effective information density associated with the tipping information that may be available on the card. For example, lenticular printing processes may make two or three gratuity levels available using the space required for a single tipping guide.

In some implementations, similar gains in information density may be achieved by overlaying multiple images (e.g., gratuities for 15% and 20%) on the same region on the card. The user may see display of one image (e.g., 15% gratuity) by default, and may select an alternate image (e.g., 20% gratuity) by performing a prescribed operation.

Various embodiments may also be adapted to display an alternate gratuity in response to the user increasing a temperature of the card surface, for example, by pressing or rubbing a relevant portion of the card with the relevant gratuity display. Such a thermal-induced response may be provided by images formed on the card using thermochromic ink. Some embodiment may be viewable from a substantially wide viewing angle while requiring only a momentary application of some localized rubbing (e.g., with a finger) or thermal communication with some other source of local temperature increase in order to produce an alternate display, when needed. Some card users may value the ability to quickly and discreetly determine a user-selected gratuity at any viewing angle, for example.

In some embodiments, the card may be adapted to display an alternate gratuity in response to the application of moisture (e.g., water) to the card surface, for example, in a relevant portion of the card with the relevant gratuity information. Such a moisture-induced response may be provided by a card formed using water-metachromatic laminates, for example. Some card users may wish, for example, to only display the tipping guide as needed, for example, at a restaurant, which restaurant is likely to have readily available glasses of water from which an activating sample may be obtained to induce a state change in the gratuity display. In some embodiments, no gratuity may be visible unless water or similar source of moisture is applied. In some other embodiments, a default tipping guide with a default gratuity may be displayed while dry, and a second tipping guide (e.g., with a second gratuity) may be temporarily displayed (or a selected portion thereof may be displayed) in response to exposure to substantial moisture.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A transaction card, comprising:
   a first film with a first planar surface lying substantially in a first plane;
   a second film with a second planar surface lying substantially in a second plane that is parallel to the first plane; and,
   a core layer disposed between the first film and the second film and comprising a plurality of indicators displayed along a perimeter of the core layer, each of the plurality of indicators extending at least partially between a textual indicator representative of a financial amount displayed on the first surface and a textual indicator representative of a predetermined percentage of said financial amount displayed on the second surface,
   wherein said first and second film comprise plastic, at least a portion of said transaction card is configured to contain machine readable information, and said indicators displayed on the core layer, the first surface and the second surface comprise printed indicia visible to a card user to facilitate visual association of each said financial amount to said corresponding predetermined percentages of said financial amount.

2. A transaction card, comprising:
a base having a front card surface comprising a first outer area at an edge of the base, the first outer area having a first set of a plurality of different financial amount indicators on the first outer area, and the base having a back card surface comprising a second outer area at the edge of the base, the second outer area having a second set of a plurality of different financial amount indicators that are aligned with the first set of the plurality of different financial amount indicators, the financial amount indicators of the second set being predetermined percentages of the financial amount indicators of the first set of which they are aligned with; and
a region configured to carry machine readable information.

3. The transaction card of claim 2, wherein said first and second outer areas are oppositely facing outer areas.

4. The transaction card of claim 2, wherein said region includes at least one of a magnetic stripe, a compound, a plurality of punched holes, and an RFID tag.

5. The transaction card of claim 2, where said first and second sets of financial amount indicators are applied by a card manufacturer.

6. The transaction card of claim 2, wherein said first and second sets of financial amount indicators are applied during manufacture of said card.

7. The transaction card of claim 2, wherein said first and second sets of financial amount indicators are printed indicators and are applied after manufacture of said card.

8. The transaction card of claim 2, wherein said first and second sets of financial amount indicators are printed indicators.

9. The transaction card of claim 2, wherein the transaction card is configured to facilitate at least one of a financial transaction, an identity transaction, and a transaction for admittance to a secured area.

10. The transaction card of claim 2, wherein said first set of financial amount indicators on the front card surface are associated with lines that are aligned with lines associated with the second set of financial indicators on the back card surface.

11. The transaction card of claim 2, comprising a plurality of the financial amount indicators of the first set each being in a plane with a corresponding financial amount indicator of the second set of indicators.

12. The transaction card of claim 2, wherein said card is one of a solid card, semi-solid card, opaque card, semi-opaque card, lucid card, transparent card, clear card, rigid card, and flexible card.

13. The transaction card of claim 2, wherein said card is one of a plastic card, graphite card, metal card, and lucite card.

14. The transaction card of claim 2, wherein said first and second sets of financial amount indicators are at least one of etched indicators, and affixed indicators.

15. The transaction card of claim 2, wherein at least one of the first and second set of financial amount indicators is included on a sticker that is adhered to the transaction card.

16. The transaction card of claim 15, wherein said first set of financial amount indicators on the front card surface are associated with lines that are aligned with lines associated with the second set of financial amount indicators on the back card surface.

17. The transaction card of claim 15, comprising a plurality of the financial amount indicators of the first set each being in a plane with a corresponding financial amount indicator of the second set of indicators.

* * * * *